United States Patent
Klinger et al.

(10) Patent No.: US 10,185,321 B2
(45) Date of Patent: Jan. 22, 2019

(54) UNMANNED VEHICLE, SYSTEM AND METHOD FOR DETERMINING A PLANNED PATH FOR UNMANNED VEHICLES

(71) Applicant: Proxy Technologies, Inc., Reston, VA (US)

(72) Inventors: John Klinger, Reston, VA (US); Patrick C. Cesarano, Washington, DC (US)

(73) Assignee: PROXY TECHNOLOGIES, INC., Reston, VA (US)

( * ) Notice: Subject to any disclaimer, the term of this patent is extended or adjusted under 35 U.S.C. 154(b) by 0 days.

(21) Appl. No.: 15/206,229

(22) Filed: Jul. 9, 2016

(65) Prior Publication Data
US 2017/0229025 A1     Aug. 10, 2017

Related U.S. Application Data

(60) Provisional application No. 62/291,344, filed on Feb. 4, 2016.

(51) Int. Cl.
*G05D 1/00* (2006.01)
*G05D 1/02* (2006.01)
(Continued)

(52) U.S. Cl.
CPC ......... *G05D 1/0214* (2013.01); *B64C 39/024* (2013.01); *G01B 9/021* (2013.01); *G01B 11/00* (2013.01); *G01C 21/165* (2013.01); *G01N 21/8851* (2013.01); *G01N 27/20* (2013.01); *G01S 7/006* (2013.01); *G01S 13/02* (2013.01); *G01S 13/42* (2013.01); *G01S 15/02* (2013.01); *G01S 19/13* (2013.01); *G05B 11/42* (2013.01); *G05B 13/024* (2013.01); *G05D 1/0022* (2013.01); *G05D 1/0027* (2013.01);
(Continued)

(58) Field of Classification Search
CPC .............. G08G 5/0039; B64C 39/024; B64C 2201/141; B64C 2201/146; B64C 2201/021; B64C 2201/024; G05D 1/0027; G01S 19/13
See application file for complete search history.

(56) References Cited

U.S. PATENT DOCUMENTS 8,155,811 B2 * 4/2012 Noffsinger ............. B61L 3/006
                                                          701/21
9,310,222 B1 * 4/2016 Suiter .................. G01C 23/005
(Continued)

*Primary Examiner* — Genna M Mott
(74) *Attorney, Agent, or Firm* — Kenealy Vaidya LLP

(57) ABSTRACT

Some embodiments are directed to an unmanned vehicle. The unmanned vehicle can include a memory unit that is configured to store a planned path of the unmanned vehicle. The unmanned vehicle can also include a position unit that is configured to determine a current position of the unmanned vehicle, the position unit further configured to determine a planned position of the unmanned vehicle based on the planned path data stored in the memory unit. The unmanned vehicle can further include a control unit disposed in communication with the position unit, the control unit configured to determine a deviation based on the planned position and the current position of the unmanned vehicle, and control a movement of the unmanned vehicle such that the unmanned vehicle moves along the planned path if the deviation is less than a predetermined threshold.

16 Claims, 8 Drawing Sheets

(51) Int. Cl.
| | | |
|---|---|---|
| G06K 9/00 | (2006.01) | |
| G01B 9/021 | (2006.01) | |
| G01B 11/00 | (2006.01) | |
| G01N 21/88 | (2006.01) | |
| G01N 27/20 | (2006.01) | |
| G01S 13/02 | (2006.01) | |
| G01S 15/02 | (2006.01) | |
| H04N 5/225 | (2006.01) | |
| H04N 7/18 | (2006.01) | |
| H01Q 3/26 | (2006.01) | |
| G01S 7/00 | (2006.01) | |
| G01S 13/42 | (2006.01) | |
| B64C 39/02 | (2006.01) | |
| G01C 21/16 | (2006.01) | |
| G01S 19/13 | (2010.01) | |
| G08G 5/04 | (2006.01) | |
| G08G 9/02 | (2006.01) | |
| G05D 1/10 | (2006.01) | |
| G05B 11/42 | (2006.01) | |
| G05B 13/02 | (2006.01) | |
| G08G 5/00 | (2006.01) | |
| H01Q 3/28 | (2006.01) | |
| H01Q 3/36 | (2006.01) | |
| H04B 7/06 | (2006.01) | |
| H04B 7/185 | (2006.01) | |
| G05B 13/04 | (2006.01) | |
| G01S 13/06 | (2006.01) | |

(52) U.S. Cl.
CPC ......... *G05D 1/0088* (2013.01); *G05D 1/0094* (2013.01); *G05D 1/02* (2013.01); *G05D 1/021* (2013.01); *G05D 1/0202* (2013.01); *G05D 1/0204* (2013.01); *G05D 1/0206* (2013.01); *G05D 1/0246* (2013.01); *G05D 1/0278* (2013.01); *G05D 1/104* (2013.01); *G06K 9/00637* (2013.01); *G06K 9/00677* (2013.01); *G08G 5/0039* (2013.01); *G08G 5/045* (2013.01); *G08G 9/02* (2013.01); *H01Q 3/26* (2013.01); *H01Q 3/2617* (2013.01); *H01Q 3/28* (2013.01); *H01Q 3/36* (2013.01); *H04B 7/0617* (2013.01); *H04B 7/18506* (2013.01); *H04N 5/225* (2013.01); *H04N 7/183* (2013.01); *B64C 2201/021* (2013.01); *B64C 2201/024* (2013.01); *B64C 2201/141* (2013.01); *B64C 2201/143* (2013.01); *B64C 2201/146* (2013.01); *G01N 2201/12* (2013.01); *G01S 13/06* (2013.01); *G01S 2013/0254* (2013.01); *G05B 13/042* (2013.01); *G05D 2201/0207* (2013.01); *H04N 2005/2255* (2013.01)

(56) References Cited

U.S. PATENT DOCUMENTS

| | | | |
|---|---|---|---|
| 2014/0073349 A1* | 3/2014 | Schunk | G01S 5/0252 455/456.1 |
| 2014/0081505 A1* | 3/2014 | Klinger | G08G 1/162 701/25 |
| 2016/0026179 A1* | 1/2016 | Humenay | G05D 1/0022 701/2 |

\* cited by examiner

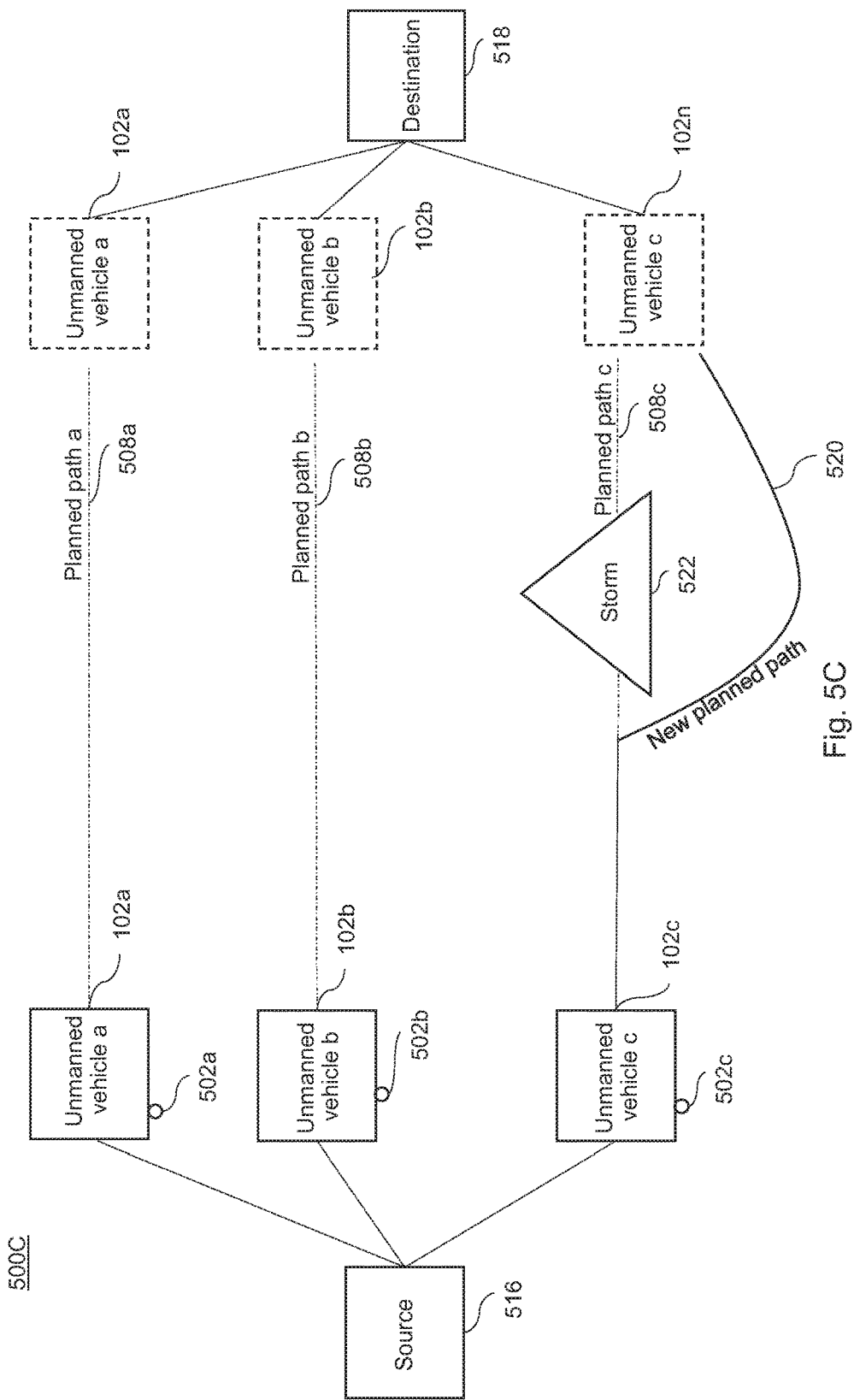

UNMANNED VEHICLE, SYSTEM AND METHOD FOR DETERMINING A PLANNED PATH FOR UNMANNED VEHICLES

PRIORITY INFORMATION

This Application claims priority to provisional Application 62/291,344 filed on Feb. 4, 2016. The substance of Application 62/291,344 is hereby incorporated in its entirety into this Application.

BACKGROUND

The disclosed subject matter relates to unmanned vehicles or optionally manned vehicles, systems and methods for controlling unmanned vehicles or optionally manned vehicles. More particularly, the disclosed subject matter relates to systems and methods for determining a planned path for unmanned vehicles or optionally manned vehicles.

The unmanned vehicle is a vehicle without a person on board, which is capable of sensing their surrounding and navigation on their own. The unmanned vehicle can operate in, but not restricted to, air, water, land, and so forth. The unmanned vehicle can either be autonomous or remotely operated by an operator. Optionally manned vehicles can be operated with or without a person on board. The optionally manned vehicles may enable manual testing of the vehicles before unmanned operation or allow manual control, if necessary, during an unmanned mode of operation.

Generally, the unmanned vehicles or optionally manned vehicles are vulnerable to collisions with each other and/or with obstacles present in their operational environments. These collisions may result from a lack of geographic information of an obstacle and/or unpredictable environmental conditions. Further, a group of unmanned vehicles may have increased likelihood of such collisions as each of the unmanned vehicles may be subject to similar changes in the environmental conditions.

SUMMARY

Unmanned vehicles are in danger of colliding with each other (hereinafter referred to as vehicle-to-vehicle collision) or with obstacles present in their operational environments. For example, a single unmanned aerial vehicle, while moving along its trajectory, can collide with obstacles, such as, but not restricted to, buildings, antennas, birds, other aerial vehicles. In other exemplary scenarios, a single unmanned terrestrial, aquatic, oceanic or space vehicle can suffer similar collisions with the obstacles, such as, but not restricted to, trees, rocks, sand banks, coral, orbital debris, and so forth.

The unmanned vehicle typically collides with the obstacle and/or with other unmanned vehicles due to lack of information regarding their positions in the operational environment of the unmanned vehicle. Also, in case of sudden changes in environmental conditions, it difficult for the unmanned vehicle, to collect information of the obstacle and/or the other unmanned vehicle. The environmental changes may be, but not restricted to, change in wind patterns, low visibility, temperature fluctuations, turbulence, and so forth. Such environmental changes may cause the unmanned vehicles to unpredictably veer off-course and lead to the aforementioned collisions. In some other embodiments, the unmanned vehicle can face deviation from the planned path due to hardware and/or software faults.

In another exemplary scenario, unmanned vehicles in a fleet may be prone to vehicle-to-vehicle collisions or collisions with the obstacles as each of the unmanned vehicle is subject to similar unpredictable changes in their operational environments.

Optionally manned vehicles can also suffer from collisions similar to the unmanned vehicles due to various reasons including those described above with reference to the unmanned vehicles.

Some related arts mitigate such collisions by enabling an unmanned vehicle to calculate a planned path. The planned path is designed to impede vehicle-to-vehicle collisions and/or collisions with known obstacles. However, due to unpredictable environmental conditions including, but not restricted to, unexpected obstacles and rough weather, the unmanned vehicles can deviate from their planned paths. The deviations may be minor in nature or major depending on the severity of the environmental conditions. For example, minor gusts of wind may cause deviations lesser than deviations caused by hurricane force winds.

In some related arts, the unmanned vehicle calculates a new path after deviation from its planned path. The calculated path may be, but not restricted to, a short term path, a long term path and/or a combination of both. Additionally, the deviation faced by the unmanned vehicle, because of any of the reasons stated above, can be a slight or a minor deviation and/or an extensive or a major deviation. A slight or a minor deviation can be due to minor obstacles such as, but not restricted to, a minor gust of wind, birds, and the like. In another exemplary scenario, the unmanned vehicle can face an extensive or a major deviation due to presence of large obstacles. The large obstacles can include, but not restricted to, hurricane force winds, heavy rain, orbital debris, bodies of water, an aircraft, and so forth.

However, in some related arts, the unmanned vehicle calculates and executes a new planned path irrespective of a severity or a magnitude of the deviation. For example, if the deviation in the planned path is slight or minor, and the unmanned vehicle generates a new planned path, then the unmanned vehicle may require more time to reach an intended destination, and the journey may be fuel inefficient. Further, in some cases, calculating a new planned path repeatedly due to minor deviations may lead to collisions with other unmanned vehicles and/or obstacles due to extreme and frequent changes in planned paths. Therefore, it may be inefficient to re-calculate a new planned path every time the unmanned vehicle detects a deviation from its planned path.

Further, in some related arts, the unmanned vehicle calculates and executes a new planned path due to deviations caused by hardware and/or software faults in the unmanned vehicle. In such cases, the calculation of the new planned path can be erroneous leading to collisions with other unmanned vehicles and/or obstacles. Further, calculation of new planed paths repeatedly to compensate for faults or defects can be inefficient.

It may therefore be beneficial to provide an unmanned vehicle, a system, and a method of use thereof, that address at least one of the above issues. For example, it may be beneficial to provide an unmanned autonomous vehicle that can appropriately determine when to calculate and execute a new planned path.

It may therefore be beneficial to provide an unmanned vehicle, a system, and a method of use thereof, that address at least one of the above and/or other disadvantages. In particular, in may be beneficial to provide an unmanned vehicle, a system, and a method to employ deviation limits into software/hardware used by the unmanned vehicle. For example, it may be beneficial to configure an unmanned vehicle that can calculate and execute a new planned path in case of extensive or major deviations and/or abstain from new path calculation in case of very slight or minor deviations.

It may therefore be beneficial to provide an unmanned vehicle, a system, and a method of use thereof, that address at least one of the above and/or other disadvantages. In particular, it may be beneficial to provide an unmanned vehicle, a system, and a method to reduce errors in coordination between unmanned vehicles of a fleet due to repeated path calculations. For example, it may be beneficial to arrange an unmanned vehicle, a system that can decide whether a new planned path is computationally and/or mechanically efficient or not, and help in coordination between the unmanned vehicle with other unmanned vehicles in the fleet and/or with a base station.

It may therefore be beneficial to provide an unmanned vehicle, a system, and a method of use thereof, that address at least one of the above and/or other disadvantages. In particular, it may be beneficial to provide an unmanned vehicle, a system, and a method for detecting a non-conforming unmanned vehicle in a fleet based on a deviation pattern. Such non-conformance may be due to hardware and/or software faults, and can result in unreliable movement of the unmanned vehicle. For example, it may be beneficial to arrange an unmanned vehicle, a system, and a method that can determine a deviation of the unmanned vehicle, and compare the deviation to a conformance threshold in order to determine whether the unmanned vehicle is non-conforming. Identifying and flagging one or more non-conforming vehicles in the fleet can help in coordination between the other conforming unmanned vehicles in the fleet, thereby avoiding or impeding any collisions.

Some embodiments are therefore directed to a method of controlling an unmanned vehicle operatively coupled to a controller. The method can include determining, by the controller, a current position of the unmanned vehicle; determining, by the controller, a planned position of the unmanned vehicle based on a planned path of the unmanned vehicle; determining, by the controller, a deviation based on the planned position and the current position of the unmanned vehicle; and controlling, by the controller, a movement of the unmanned vehicle such that the unmanned vehicle moves along the planned path if the deviation is less than a predetermined threshold.

Some other embodiments are directed to an unmanned vehicle. The unmanned vehicle can include a memory unit that is configured to store a planned path of the unmanned vehicle. The unmanned vehicle can also include a position unit that is configured to determine a current position of the unmanned vehicle, the position unit further configured to determine a planned position of the unmanned vehicle based on the planned path stored in the memory unit. The unmanned vehicle can further include a control unit disposed in communication with the position unit, the control unit configured to determine a deviation based on the planned position and the current position of the unmanned vehicle, and control a movement of the unmanned vehicle such that the unmanned vehicle moves along the planned path if the deviation is less than a predetermined threshold.

Yet other embodiments are directed to a system including multiple unmanned vehicles spaced from each other. The system including the unmanned vehicles, wherein each of the unmanned vehicles can include a memory unit that is configured to store a planned path of the unmanned vehicle. The system including the unmanned vehicles, wherein each of the unmanned vehicle can also include a position unit that is configured to determine a current position of the unmanned vehicle, the position unit further configured to determine a planned position of the unmanned vehicle based on the planned path stored in the memory unit. The system including the unmanned vehicles, wherein each of the unmanned vehicles can also include a control unit disposed in communication with the position unit. The controller is configured to determine a deviation based on the planned position and the current position of the unmanned vehicle, and determine a new planned path for the unmanned vehicle if the deviation is greater than or equal to the predetermined threshold. The controller is further configured to communicate the new planned path to the other unmanned vehicles, and control a movement of the unmanned vehicle such that the unmanned vehicle moves along the new planned path.

In other embodiments, a deviation of an unmanned vehicle from its planned path is determined and compared with a conformance threshold. If the deviation is greater than or equal to the conformance threshold, the unmanned vehicle is flagged as a non-conforming unmanned vehicle. Further, the conformance threshold can be a predetermined value that is part of planned path data. Moreover, the conformance threshold can be equal to predetermined threshold used for calculating a new planned path.

As mentioned above, current related art technologies usually do not modify their behaviors in response to a combination of external factors (say, a vehicle veering off course unexpectedly) and in conjunction with a threshold parameter range (say, + or −20% in velocity, range, altitude, etc.). Some disadvantages of this strategy are that small deviations (say, 5%) could cause a vehicle to instantly re-process its planned path, which may unnecessarily consume processing resources. Additionally, such a re-calculation might be unnecessary for collision avoidance if other vehicles are well spaces from the vehicle that finds itself off-course.

Some of the disclosed embodiments address this problem by establishing parameters that would signify safe and unsafe limits on vehicle performance. For example, deviating from certain spatial, speed, acceleration, yaw, roll, pitch, or other thresholds could cause the vehicle to re-calculate a new planned path. Additionally, the vehicle may utilize a time parameter before initializing a correction to this deviation to allow one or more neighboring vehicles to correct their own paths in conjunction with the newly corrected planned path of the first vehicle.

A further advantage of such an approach is that the initial vehicle can evaluate statistically how far out of range any of the aforementioned parameters is and make a decision to perform self-correction without disturbing each of the other neighboring vehicles. Finally, an off-course vehicle may not even need to perform any correction whatsoever (such as a gust of wind passing that tugs and pushes, but ultimately returns the vehicle to its initial trajectory). By utilizing this approach in parallel with negative feedback systems such as phase-locked loops, PID controllers, etc., significant RF bandwidth and processing resources can be preserved for numerous higher priority applications.

BRIEF DESCRIPTION OF THE DRAWINGS

The disclosed subject matter of the present application will now be described in more detail with reference to exemplary embodiments of the apparatus and method, given by the way of example, and with reference to the accompanying drawing, in which:

FIG. 5C is an exemplary environment for detecting an environmental condition in a planned path and path correction by an unmanned vehicle in accordance with the disclosed subject matter.

DETAILED DESCRIPTION OF EXEMPLARY EMBODIMENTS

A few inventive aspects of the disclosed embodiments are explained in detail, below with reference to various figures. Exemplary embodiments are described to illustrate the disclosed subject matter, not to limit the scope, which is defined by the claims. Those of ordinary skill in the art will recognize a number of equivalent variations of the various features provided in description that follows.

I. Unmanned Vehicle

Figure 1:
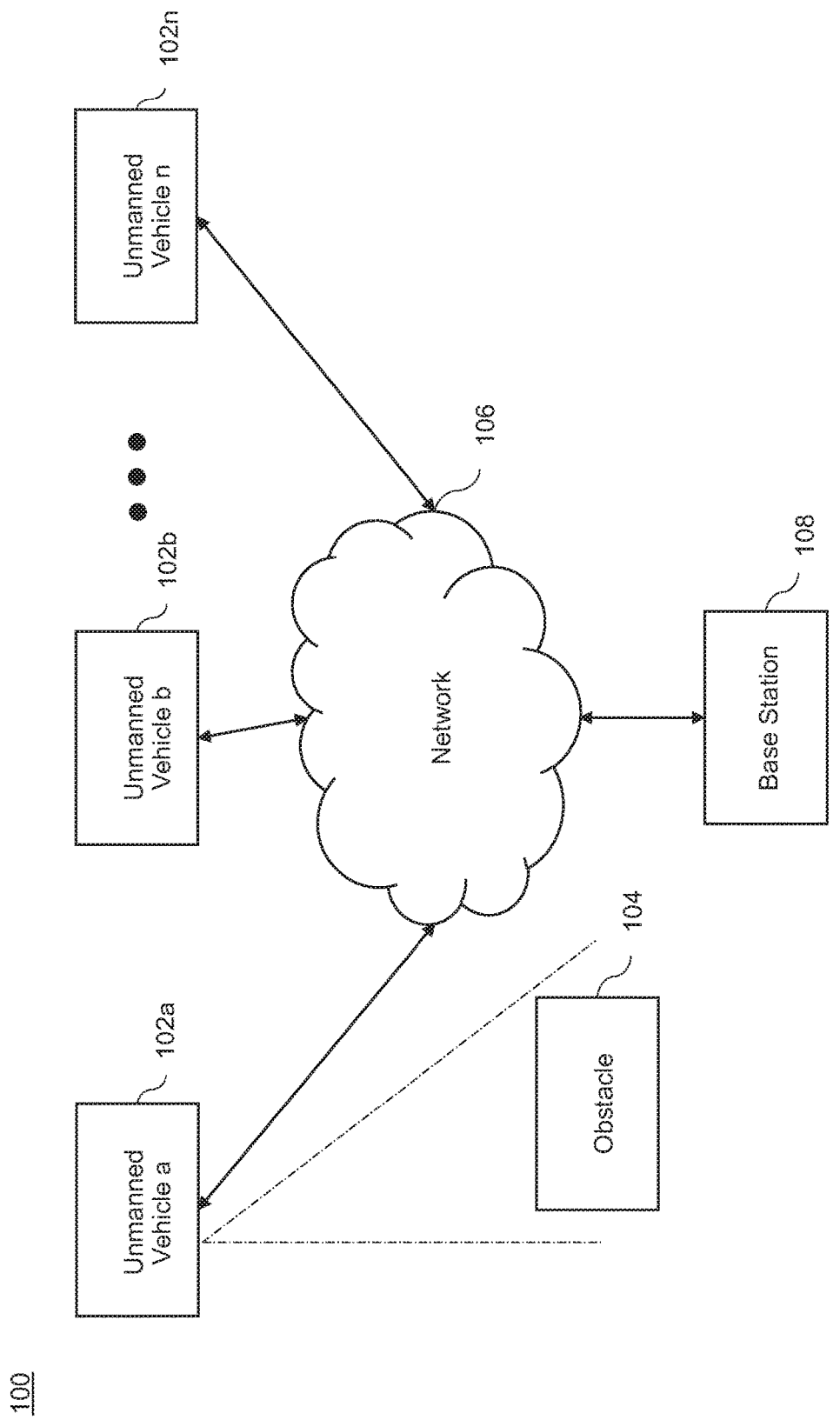
FIG. 1 is an exemplary system of unmanned vehicles in accordance with the disclosed subject matter.

FIG. 1 is an exemplary system 100 for determining a path for the unmanned vehicle 102 in accordance with the disclosed subject matter.

FIG. 1 illustrates the system 100 that includes unmanned vehicles 102a-n, hereinafter referred to as an unmanned vehicle 102 and collectively referred to as unmanned vehicles 102. The unmanned vehicle 102, and embodiments are intended to include or otherwise cover any type of unmanned vehicle, including an unmanned aerial vehicle, an unmanned terrestrial vehicle, a drone, a gyrocopter, an unmanned oceanic vehicle, an unmanned space vehicle, and the like. In some embodiments, the unmanned aerial vehicle can be, but not restricted to, an unmanned aerial surveillance vehicle, a drone, a recreational toy, and so forth. In fact, embodiments are intended to include or otherwise cover any type of unmanned vehicle that may stay geostationary in the sky and/or fly at considerable height. The unmanned aerial vehicle 102 is merely provided for exemplary purposes, and the various inventive aspects are intended to be applied to any unmanned autonomous vehicle.

In some other embodiments, the unmanned vehicle 102 may be an optionally manned vehicle. The optionally manned vehicle, and embodiments are intended to include or otherwise cover any type of optionally manned vehicle, including an optionally manned aerial vehicle, an optionally manned terrestrial vehicle, a drone, a gyrocopter, an optionally manned oceanic vehicle, an optionally manned space vehicle, and the like. In fact, embodiments are intended to include or otherwise cover any type of optionally manned vehicle.

In an exemplary scenario, the unmanned vehicle 102 can be a fixed-wing unmanned aircraft. In some other exemplary scenarios, the unmanned vehicle 102 can be a rotorcraft.

In alternative embodiments, the system 100 can also include one or more unmanned vehicles and optionally manned vehicle.

In some embodiments, the unmanned vehicle 102 can be manually controlled by an operator present at a base station 108. In some embodiments, the unmanned vehicle 102 may be autonomously controlled, which involves an operator entering and/or selecting one or more attributes and subsequent autonomous control of the unmanned vehicle 102 based on entered and/or selected parameters. In fact, embodiments are intended to include or otherwise cover any type of techniques, including known, related art, and/or later developed technologies to control the unmanned vehicle 102.

For operating purposes, the unmanned vehicle 102 and its components (not shown) can be powered by a power source to provide propulsion. The power source can be, but not restricted to, a battery, a combustion engine, fossil fuel, a fuel cell, a photovoltaic cell, a solar cell, and so forth. In fact, embodiments are intended to include or otherwise cover any type of power source to provide power to the unmanned vehicle 102 for its operations.

In some embodiments, the unmanned vehicle 102 can have, but not restricted to, rotors, propellers, and flight control surfaces that control movements and/or orientation of the unmanned vehicle 102, and the like. In fact, embodiments are intended to include or otherwise cover any other component that may be beneficial for controlling movements and/or orientation of the unmanned vehicle 102.

The planned path for the unmanned vehicle 102 may be a predefined path between a source and a destination. Also, the planned path for the unmanned vehicle 102 may be an optimal path between the source and the destination in terms of fuel or power consumption, travel time, collision avoidance, jurisdictional requirements, mission requirements (e.g., stealth), weather etc. The planned path can include, but not restricted to, a series of positions, speeds, altitudes, headings, and the like. Further, each position of the planned path may be linked to a corresponding speed, location, altitude and heading of the unmanned vehicle 102. In an exemplary scenario, a first position for the unmanned vehicle 102 in the series of positions may coincide with the source, while a last position may coincide with the destination. In some embodiments, the planned path may involve a round trip, and therefore, the source may coincide with the destination. The planned paths may also be segmented, such as a first planned path from the source to site 1 (not shown), a second planned path from site 1 to site 2 (not shown), and a third planned path from site 2 to the destination.

Further, in some embodiments, the unmanned vehicle 102 can also include, but not restricted to, a processor (not shown), a memory (not shown), and the like. The processor (not shown) can be configured to generate a planned path and/or execute the planned path on receiving a signal from the companion unmanned or optionally manned vehicles, the base station 108, an external communication device, and the like. In some embodiments, the processor of unmanned vehicle 102 can be a single core processor. In alternate embodiments, the processor can be a multi core processor. Embodiments are intended to include or otherwise cover any type of processor, including known, related art, and/or later developed technologies to enhance capabilities of processing data and/or instructions.

In addition, the memory (not shown) of the unmanned vehicle 102 can store data used to generate a planned path for the unmanned vehicle, geographical location of an obstacle 104, and so forth. The memory can be used to store instructions that can be processed by the processor. Embodiments are intended to include or otherwise cover any type of memory, including known, related art, and/or later developed technologies to enhance capabilities of storing data and/or instructions.

The base station 108 can be a fixed base station 108 or a mobile base station 108. In some other embodiments, the mobile base station 108 may include, but not restricted to, an unmanned aerial vehicle, an unmanned terrestrial vehicle, and the like. It may also be contemplated that the base station 108 may be, but not restricted to, an electronic device, such as a smartphone, a laptop, a remote control device, and the like. In fact, embodiments are intended to include or otherwise cover any type of base station 108, including known, related art, and/or later developed technologies to communicate with other unmanned vehicles 102.

Moreover, each of the unmanned vehicles 102 may communicate with the base station 108, or companion unmanned vehicles through a communication network 106. In some embodiments, the unmanned vehicle 102 may communicate with the base station 108 via the communication network 106 to notify a change in the planned path made by the unmanned vehicle 102.

In some embodiments, the communication network 106 may include a data network such as, but not restricted to, the Internet, local Area Network (LAN), Wide Area Network (WAN), Metropolitan Area Network (MAN), etc. In certain embodiments, the communication network 106 can include a wireless network, such as, but not restricted to, a cellular network and may employ various technologies including Enhanced Data rate for Global Evolution (EDGE), Genera; Packet Radio Service (GPRS), Global System for Mobile communication (GSM), Internet protocol Multimedia Subsystem (IMS), Universal Mobile Telecommunication System (UTMS), etc. In some embodiments, the communication network 106 may include or otherwise cover networks or subnetworks, each of which may include, for example, a wired or wireless data pathway. The communication network 106 may include a circuit-switched voice network, a packet-switched data network, or any other network capable for carrying electronic communications. For example, the network may include networks based on the Internet protocol (IP) or Asynchronous Transfer Mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the communication network 106 may include, but not limited to, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and so forth. Embodiments are intended to include or otherwise cover any type of communication network, including known, related art, and/or later developed technologies to communicate with other unmanned vehicles 102 or the base station 108.

In the system 100, as shown in FIG. 1, the unmanned vehicle 102 is moving on a planned path. The unmanned vehicle 102 detects the obstacle 104 in its planned path and deviates from its planned path due to the obstacle 104. In some embodiments, the obstacle 104 can be, but not restricted to, birds, flying objects, hurricane force winds, overhead cables, buildings, antenna, tower, and so forth.

In some embodiments, the unmanned vehicle 102 detects deviation from the planned path of the unmanned vehicle 102 based on deviation parameters. The deviation parameters may include, but not restricted to, vehicle trajectory parameters, environmental factors, signal parameters, and so forth. In some embodiments, the deviation can be determined with the help of vehicle trajectory parameters. The vehicle trajectory parameters can include, but not restricted to, speed, yaw, pitch, roll, elevation of the unmanned vehicle 102, and so forth. In an exemplary scenario, the unmanned vehicle 102 may be assigned pre-defined values of the vehicle trajectory parameters, and if any of the vehicle trajectory parameter changes during the course of journey, the unmanned vehicle 102 is considered as being deviated from its planned path. In fact, embodiments of the present invention are intended to include or otherwise cover any number of vehicle trajectory parameters that determines deviation of the unmanned vehicle 102 from its planned path.

The deviation in the planned path of the unmanned vehicle 102 can also be due to various environmental factors, for example, heavy winds can force the unmanned vehicle 102 away from its planned path. The environmental factors may be, but not restricted to, wind speed turbulence, weather, visibility, and the like.

In yet another embodiment, the unmanned vehicle 102 detects deviation in the planned path of the unmanned vehicle 102 based on signal parameters of the unmanned vehicle 102 such as, but not restricted to, signal strength, transmitter/receiver data rate, transmitter/receiver sensitivity, transmitter/receiver power, a phase of the signal, and so forth.

The unmanned vehicle 102 is configured to communicate with the other companion unmanned vehicles 102. In some embodiments, the unmanned vehicle 102 may communicate with the other companion unmanned vehicles 102 through, but not restricted to, a communication network such as the communication network 106 of the system 100.

Further, the functioning of the unmanned vehicle 102 is described in greater detail below in conjunction with FIG. 2.

II. Functioning of the Unmanned Vehicle

Figure 2:
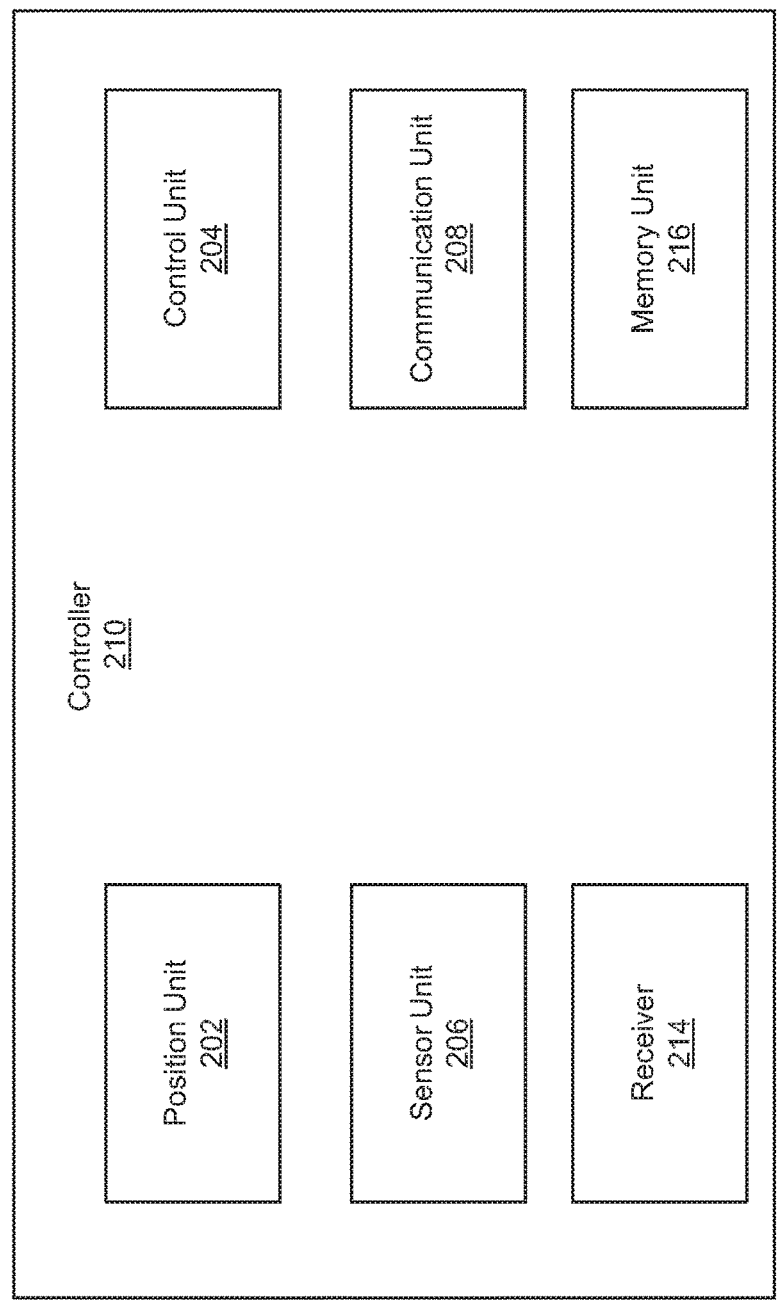
FIG. 2 illustrates components of one of the unmanned vehicles in accordance with the disclosed subject matter.

FIG. 2 illustrates components of the unmanned vehicle 102, in accordance with the disclosed subject matter. As discussed, the unmanned vehicle 102 can be configured to detect the deviation from the planned path, and thereafter, move back to the planned path, modify the planned path or generate a new planned path. In some exemplary scenarios, the deviation from the planned path may be due to the presence of the obstacle 104 in the planned path, changes in vehicle trajectory parameters, variations in environmental factors, changes in signal parameters, and so forth.

In some embodiments, the unmanned vehicle 102 may have a controller 210 that may include, but not restricted to, a position unit 202, a control unit 204, a sensor unit 206, a communication unit 208, a receiver 214, and a memory unit 216. Also, controller 210 may have multiple such components. The controller 210 may be, but not restricted to, a wireless controller and/or a wired controller. In fact, embodiments of the disclosed subject matter are intended to include or otherwise cover any number of components in the unmanned vehicle 102 to detect the deviation from the planned path. In some other embodiments, the controller 210 can be situated outside the unmanned vehicle 102. In an exemplary scenario, the controller 210 is at the base station 108 and can control the movement of the unmanned vehicle 102. Also in other exemplary scenario, the movement of the unmanned vehicle 102 can be controlled by a controller of another unmanned vehicle.

The controller 210 is configured to control various operations of the unmanned vehicle 102 including, but not limited to, a movement of the unmanned vehicle 102, controlling and coordinating operations between various components of the unmanned vehicle 102, interfacing with other unmanned vehicles 102, processing information received from the base station 108 and/or other unmanned vehicles 102, detecting deviation of the unmanned vehicle 102 from the planned path, generating a new planned path for the unmanned vehicle 102, and so forth. In fact, embodiments of the disclosed subject matter are intended to include or otherwise cover any operation of the controller 210 that may be beneficial to detect any deviation from the planned path.

In some embodiments, the position unit 202 can be configured to determine a position of the unmanned vehicle 102 in the system 100. The position unit 202 may determine the position of the unmanned vehicle 102 through various techniques such as, but not restricted to, ranging tones, relative vehicle telemetry, optical imaging, radar based techniques, global positioning system (GPS), inertial navigation, microwave ranging techniques, ultra sound ranging techniques, laser ranging, or a combination thereof. The embodiments of the current disclosed subject matter are intended to include or otherwise cover any technique, including known, related art, and/or later developed technologies that may be beneficial for determining the position of the unmanned vehicle 102.

In an exemplary scenario, the unmanned vehicle 102 uses a GPS based system to determine its position. In another scenario, the unmanned vehicle 102 may combine GPS data with inertial navigation to determine its position.

In some embodiments, the position unit 202 is configured to determine a current position '$P_c$' of the unmanned vehicle 102. In an exemplary scenario, the position unit 202 gathers data from the surroundings (e.g., a landmark) and/or companion unmanned vehicles and then determines a current position '$P_c$' of the unmanned vehicle 102 based on the gathered data.

In yet another embodiment, the position unit 202 is configured to determine a planned position '$P_p$' of the unmanned vehicle 102 according to the planned path data stored in the memory unit 216.

In some embodiments, the position unit 202 is configured to determine the position of the unmanned vehicle 102 with respect to the position of other unmanned vehicles 102 in the system. Also in some other embodiments, the position unit 202 of the unmanned vehicle 102 is configured calculate its position with respect to a structure (i.e., a landmark) whose position is known. The structure may include, but not restricted to, a building, a tower, overhead cables, and so forth.

In some embodiments, the position unit 202 is configured to determine yaw parameters 'Y' for the current and/or planned path of the unmanned vehicle 102. The yaw parameters may include, but not restricted to, a current yaw parameter '$Y_c$' and a planned yaw parameter '$Y_p$'. In some embodiments, the yaw parameters may be, but not restricted to, a yaw angle '$Y_a$', a yaw velocity '$Y_v$' and/or yaw rate '$Y_r$' of the unmanned vehicle 102, and the like.

In some other embodiments, the position unit 202 is configured to calculate longitudinal modes 'L' of the unmanned vehicle 102. The longitudinal modes may include, but not restricted to, current longitudinal modes '$L_c$' and planned longitudinal modes '$L_p$'. The longitudinal modes of the unmanned vehicle 102 can be, but not restricted to, a pitch oscillation 'Pi'. In an exemplary scenario, the position unit 202 determines that a current pitch angle '$Pi_c$' of the unmanned vehicle 102 is 8° during take-off. The current pitch angle '$Pi_c$' is determined based on a current axis of the unmanned vehicle 102.

In another embodiment, the position unit 202 is configured to calculate a roll 'R' of the unmanned vehicle 102. The roll may be, but not restricted to, a current roll '$R_c$' according to the current path and a planned roll '$R_p$' of the unmanned vehicle 102 in accordance with the planned path.

Further, in some embodiments, the position unit 202 is configured to calculate a current speed '$S_c$' of the unmanned vehicle 102 in accordance with the current position of the unmanned vehicle 102. Also, the position unit 202 determines a planned speed '$S_p$' of the unmanned vehicle 102 in accordance with the planned position on the planned path. Further, the position unit 202 can determine a relative speed '$S_{rc}$' of the unmanned vehicle 102 relative to the other unmanned vehicles 102.

In some other embodiments, the position unit 202 determines a current heading '$H_c$' of the unmanned vehicle 102 in accordance with the current position of the unmanned vehicle 102. Also, the position unit 202 calculates a planned heading '$H_p$' of the unmanned vehicle 102 based on the planned path.

Further, the position unit 202 can be configured to calculate a current velocity '$V_c$' of the unmanned vehicle 102 based on the current position the unmanned vehicle 102. Also, in some other embodiments, the position unit 202 determines a planned velocity '$V_p$' in accordance with the planned path of the unmanned vehicle 102.

In some embodiments, the control unit 204 communicates with the position unit 202 and receives the data related to the current position and the planned position of the unmanned vehicle 102. Further, the control unit 204 can be configured to compare the current position and the planned position of the unmanned vehicle 102 and calculates a deviation from the planned path. In some embodiments, the control unit 204 determines a difference (hereinafter referred to as "the deviation") between the current position parameters and the planned position parameters.

In some other embodiments, the deviation can also occur due to environmental factors. As discussed, the environmental factor can include, but not restricted to, wind speed turbulence, weather, visibility, and the like. In an exemplary scenario, a hailstorm can cause the unmanned vehicle 102 to deviate from its planned path. In fact, embodiments of the present invention are intended to include or otherwise cover any number of the environmental factors that can cause the deviation from the planned path of the unmanned vehicle 102.

Further, in alternate embodiments, the control unit 204 determines a threshold value '$T_h$' for each of the parameters determined by the position unit 202. The threshold value, '$T_h$' can be based on the planned path parameters of the unmanned vehicle 102. Further, in some embodiments, the threshold value '$T_h$' can be predetermined by the base station 108 and included in the planned path data stored in a memory unit 216. In some other alternate embodiment, the threshold value '$T_h$' can be determined by the other companion unmanned vehicles 102. In yet another embodiment, the control unit 204 of one of the plurality of unmanned vehicles 102 can set a threshold value '$T_h$' for rest of the plurality of unmanned vehicles 102.

In some other embodiments, the control unit 204 is configured to compare the determined deviation with the threshold value '$T_h$'. The control unit 204 then determines whether there is a major deviation or minor deviation based on the comparison. In fact, embodiments of the disclosed subject matter are intended to include or otherwise cover any control unit, including known, related art, and/or later developed technologies that may be beneficial to determine the major or minor deviation of the unmanned vehicle 102 from planned path.

Further, in some other embodiments, the control unit 204 may check for more than one parameters to confirm deviation of the unmanned vehicle 102 from the planned path. For example, the control unit 204 gathers the data related to the current yaw angle '$Y_{ac}$' of the unmanned vehicle 102, and the planned yaw angle '$Y_{ap}$' of the unmanned vehicle 102. Thereafter the control unit 204 calculates the deviation, if the unmanned vehicle 102 is found deviated from its planned path, based on yaw parameters. Thereafter the control unit 204 can confirm the deviation by comparing current values and planned values of other parameters, such as pitch oscillations, roll, etc.

In an exemplary scenario, a controller 210 of the unmanned vehicle 102 determines a current altitude '$A_c$' and a planned altitude '$A_p$' of the unmanned vehicle 102. The controller 210 further determines a deviation value '$\Delta A$' by comparing the current altitude '$A_c$' and the planned altitude '$A_p$'. Further, the controller 210 compares the deviation value '$\Delta A$' with a threshold value '$T_h$' and is determined that there is a minor deviation and therefore, the unmanned vehicle 102 continues to follow the current path or moves back to the original planned path.

In yet another embodiment, the control unit 204 is configured to generate a new planned path based on the severity of deviation faced by the unmanned vehicle 102. In the above exemplary scenario, if the deviation value '$\Delta A$' is greater than or equal to the threshold value '$T_h$', then the deviation is said to be extensive or major and the unmanned vehicle 102 modifies the current path and follows a new planned path.

In another embodiment, the controller 210 of one of the plurality of unmanned vehicle 102 in a fleet decides the threshold value '$T_h$' for rest of the plurality of unmanned vehicles 102 in the fleet. In an exemplary scenario, the controller 210 of one of the unmanned vehicle 102 in a fleet gathers the deviation value faced by the rest of the unmanned vehicles 102 in the fleet. The controller 210 then determines the greatest deviation value faced by one of the unmanned vehicle in the fleet. The controller 210, compares the greatest deviation value with the common threshold value '$T_h$'. The controller 210 may then determine whether the unmanned vehicles 102 of the fleet need to generate new planned paths, move on the current paths or move back to the original planned paths.

Further, the control unit 204 is configured to control the movement of the unmanned vehicle 102. In an exemplary scenario, the control unit 204 determines the severity of deviation. If the deviation is slight or minor, then the control unit 204 controls the movements of the unmanned vehicle 102 such that the unmanned vehicle 102 moves along the current path or moves back to the original planned path. In another exemplary scenario, if the deviation is found to be major, then the control unit 204 plans a new path and controls the movement of the unmanned vehicle 102 such that the unmanned vehicle 102 moves along the new planned path.

In an exemplary scenario, the unmanned vehicle 102 may plan to move in a north direction ('$H_p$') from the base station 108 towards the destination to deliver an asset, with a speed '$S_p$' of 40 miles per hour at an altitude '$A_p$' of 1000 meters above the base station 108. Unexpectedly, heavy winds force the unmanned vehicle 102 to veer off its planned path. The position unit 202 of the unmanned vehicle 102 detects a current heading '$H_c$' of the unmanned vehicle 102 to be east with a current speed '$S_c$' of 30 miles per hour at an altitude '$A_c$' of 1200 meters above the base station 108. Accordingly, the control unit 204 determines a major deviation from the planned path and regulates flight control components of the unmanned vehicle 102 such that the unmanned vehicle 102 moves towards the north direction. Also the control unit 204 regulates appropriate speed control components (e.g., a propeller) to increase the speed 'S' of unmanned vehicle 102. Further, the control unit 204 changes the elevation of the unmanned vehicle 102 to change the altitude 'A' of the unmanned vehicle 102 to the planned altitude of 1000 meters above the base station 108. The exemplary scenario, as described above, is for illustrative purposes, and is not intended to limit the scope of the present disclosure.

The threshold value '$T_h$' determined by the control unit 204 can be changed depending upon the environmental factors. In some embodiments, the sensor unit 206 is configured to sense the change in environmental conditions. In some embodiments, the sensor unit 206 can be, but not restricted to, a humidity sensor, a temperature sensor, a pressure sensor, and so forth. In other embodiments, the sensor unit 206 can communicate with weather satellites, communication towers, weather stations and the like to obtain data regarding the weather conditions. In fact, embodiments of the disclosed subject matter are intended to include or otherwise cover any sensor including known art, related art, and/or later developed technologies for sensing any change in environmental factors and sending a signal to other sub-units present in the exemplary system 100.

Further, the sensor unit 206 transmits a signal to the control unit 204 stating one or more changes in current environmental conditions. The control unit 204 analyses and determines a new threshold value '$T_h$' for the unmanned vehicle 102 based on the detected changes in environmental conditions. In an exemplary scenario, the sensor unit 206 senses a change in wind speed, following which the sensor unit 206 sends a signal to the control unit 204. The control unit 204 then determines a new threshold value '$T_{h1}$' for the unmanned vehicle 102. Further, the control unit 204 determines the severity of deviation from the planned path by using the new determined threshold value '$T_{h1}$'.

In yet another embodiment, the sensor unit 206 senses very adverse environmental conditions and then sends a signal to the control unit 204. Further, the control unit 204 abandons the threshold value '$T_h$' or lowers the threshold value '$T_h$' during adverse environmental condition. For example, the sensor unit 206 senses very low visibility in the current path of the unmanned vehicle, then a signal is transmitted to the control unit 204 about the low visibility in the path. The control unit 204 then removes the threshold value '$T_h$' because the unmanned vehicle 102 is more prone to deviation in low visibility conditions, and frequent planning and path modifications can be inefficient. In such cases, the unmanned vehicle 102 can determine a new planned path in order to avoid adverse environmental conditions.

In some other embodiments, the sensor unit 206 is configured to sense a temporary or transient environmental phenomenon, such as a gust of wind, an air pocket and so forth. The sensor unit 206 then communicates data regarding the temporary environment to the control unit 204. Thereafter, the control unit 204 neglects the deviation caused by the temporary phenomenon and does not generate a new planned path. For example, the sensor unit 206 of the unmanned vehicle 102 senses a minor gust of wind. The sensor unit 206 informs the control unit 204 about the temporary environmental factor. Consequently, the control unit 204 does not generate a new planned path for the unmanned vehicle 102. The unmanned vehicle 102 continues to move in the original planned path, after the temporary environmental phenomenon ends or the unmanned vehicle 102 has cleared the temporary environmental phenomenon.

Also, in some embodiments, the sensor unit 206 can sense the environmental factors in advance and transmit appropriate data to the control unit 204 that can include warnings about the impeding adverse environmental conditions in the planned path. The control unit 204 then can generate a new planned path and start following it without facing deviation due to impeding environmental factors.

The communication unit 208 can be configured to establish communication between the different units present in the unmanned vehicle 102. In some embodiments, the communication unit 208 of the unmanned vehicle 102 in a fleet is configured to communicate with the other unmanned vehicles 102 in the fleet. In yet another embodiment, the communication unit 208 of the unmanned vehicle 102 can be configured to communicate with the base station 108.

In some embodiments, the communication unit 208 of the unmanned vehicle 102 can be configured to receive the planned path data from the base station 108. In yet another embodiment, the communication unit 208 is configured to receive the planned path data from the companion unmanned vehicles 102. In some other embodiments the communication unit 208, is configured to transmit a new planned path data to the base station 108 and/or to the companion unmanned vehicles 102. Also, the communication unit 208 is configured to transmit feedback (e.g., telemetry data) received from the companion unmanned vehicles 102 to the base station 108.

Further, the communication unit 208 can include communication methods that can include radio communications based on any frequency spectrum (e.g., Very High Frequency (VHF) or Ultra High Frequency (UHF)) and any supporting infrastructure (e.g., satellites, cell phone towers, etc.). In fact, embodiments of the present disclosed subject matter are intended to include or otherwise cover any type of techniques, including known, related art, and/or later developed technologies to receive and transmit the data to base station 108 and/or the other companion unmanned vehicles 102.

Further, the receiver 214 is configured to receive signal parameters, from the base station 108 and/or the other companion unmanned vehicles 102. The signal parameter can include, but not restricted to, signal strength, signal sensitivity, data transfer rate, phase of the unmanned vehicle 102 with respect to the base station 108 and/or the other companion unmanned vehicles 102, and the like. The receiver 214 then communicates the current signal parameters to the control unit 204. The control unit 204 determines the deviation by comparing the received signals with a predetermined signal threshold value '$T_h$'. In an exemplary scenario, the unmanned vehicle 102 is in phase with the base station 108. If the unmanned vehicle 102 goes out of phase, the unmanned vehicle 102 is considered to have deviated from the planned path. Subsequently, the control unit 204 can determine whether a new planned path is required or the current path is more efficient to reach the destination based on the factors discussed above.

In some embodiments, the receiver 214 can be, but not restricted to, a receive signal strength indicator (RSSI), a signal-to-noise detector, and the like. In fact, embodiments of the disclosed subject matter are intended to include or otherwise cover any type of techniques and/or receivers, including known, related art, and/or later developed technologies to receive signal parameters of the unmanned vehicle 102.

Further, the memory unit 216 is configured to store the data related to the unmanned vehicle 102. In some embodiments, the memory unit 216 is configured to store the planned path of the unmanned vehicle 102. In yet other embodiments, the memory unit 216 is configured to store the current position of the unmanned vehicle 102 determined by the position unit 202. The memory unit 216 can include any type of memory device, such as a Random Access Memory (RAM) or any other dynamic storage device. The memory unit 216 can also store information including controller instructions to be executed by the controller 210. In fact, embodiments of the disclosed subject matter are intended to include or otherwise cover any type of memory, including known, related art, and/or later developed technologies to store data related to the unmanned vehicle 102.

In some embodiments, the control unit 204 can be further configured to compare the deviation n of the unmanned vehicle 102 from its planned path with a conformance threshold value '$T_{hc}$'. The conformance threshold value '$T_{hc}$' may be a predetermined value stored in the memory unit 216. If the deviation is lesser than the conformance threshold value '$T_{hc}$', control unit 204 may determine that the unmanned vehicle 102 is properly functioning without any hardware and/or software faults, and can travel along its path in a reliable manner. However, if the deviation is greater than or equal to the conformance threshold '$T_{hc}$', the control unit 204 can determine that the unmanned vehicle 102 is non-conforming and may be unable to travel reliably along its planned path. The control unit 204 may flag the unmanned vehicle 102 as non-conforming and transmit, via the communication unit 208, the non-conformance data to the companion unmanned vehicles 102 and/or the base station 108. The unmanned vehicle 102 may be non-conforming due to hardware and/or software faults. The control unit 204 and/or the base station 108 may run diagnostics in order to determine such faults. Further, the base station 108 may assume control of the non-conforming unmanned vehicle 102 and can re-route the non-conforming unmanned vehicle 102 along a path that can impede or avoid collisions.

In other embodiments, any one of the companion unmanned vehicles 102 or the base station 108 can determine the deviation of the non-conforming unmanned vehicle 102 from its planned path and can appropriately flag the non-conforming vehicle 102. The deviation of the non-conforming vehicle 102 can be determined by various methods, such as ranging tones, relative vehicle telemetry, and so forth.

Further, in some embodiments, the conformance threshold value '$T_{hc}$' and the threshold value '$T_h$' can be substantially equal. In other embodiments, the conformance threshold value '$T_{hc}$' can be decided by the base station 108 and included in the planned path data stored in the memory unit 216.

In various embodiments, the conformance threshold value '$T_{hc}$' can correspond to various parameters, such as, but not limited to, distance, speed, altitude, yaw, roll, pitch, signal parameters, and so forth.

In further embodiments, the non-conforming unmanned vehicle 102 can be detected by its control unit 204, the base station 108 and/or any one of the companion unmanned vehicles 102 by monitoring a deviation pattern of the non-conforming unmanned vehicle 102. In case of technical faults, the deviation can be drastic and in an unexpected pattern. Therefore, non-conforming behavior can be detected in case of sudden and repeated deviations of large magnitudes from the planned path.

III. Operation of the Unmanned Vehicle

Figure 3:
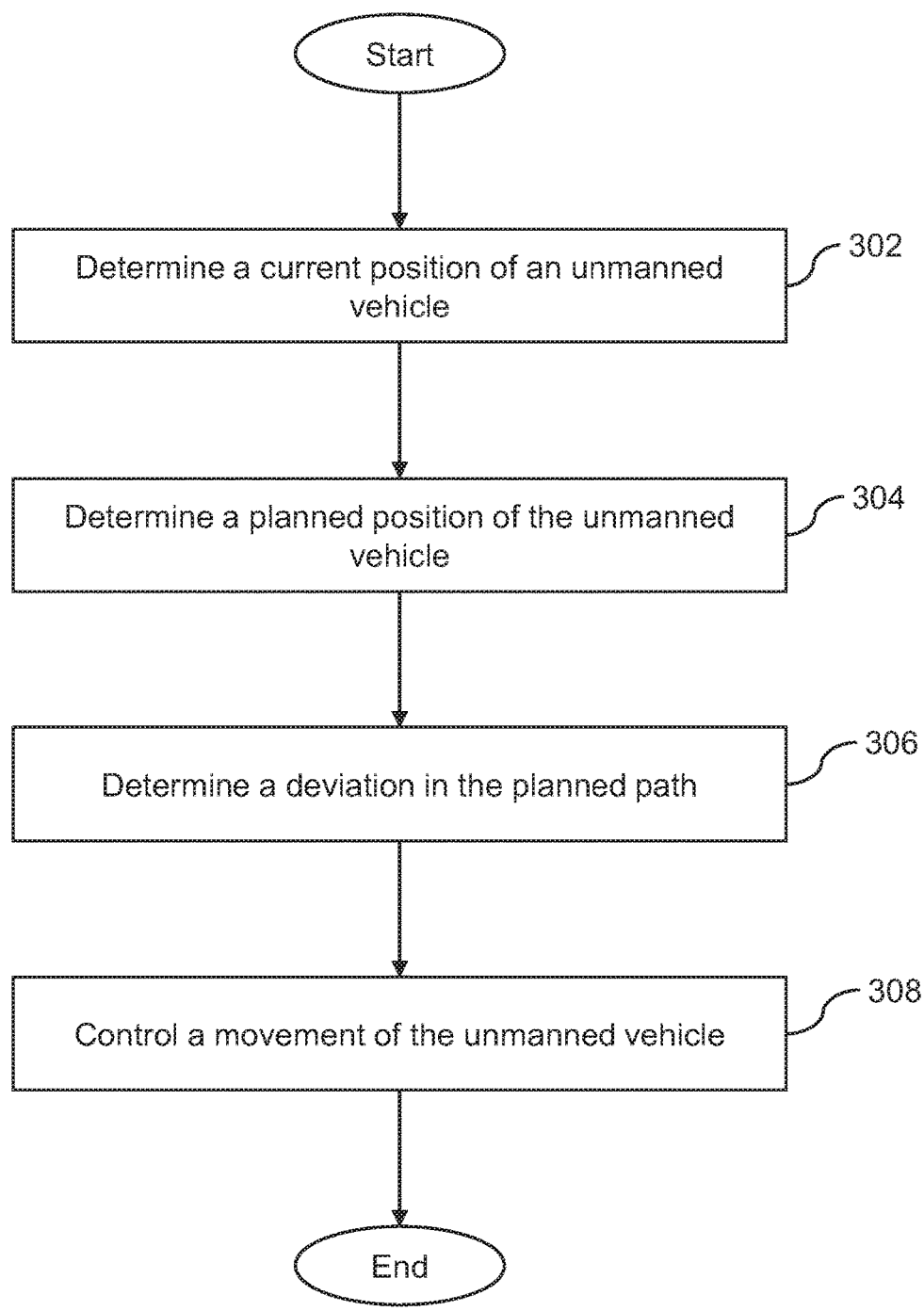
FIG. 3 is a method for detecting a deviation in a planned path by using an unmanned vehicle in accordance with the disclosed subject matter.

FIG. 3 is a flow chart of a procedure 300 for determining a planned path for an unmanned vehicle in accordance with the disclosed subject matter. In some embodiments, the unmanned vehicle 102 can be an unmanned aerial vehicle. This flowchart is merely provided for exemplary purposes, and embodiments are intended to include or otherwise cover any methods or procedures, including known, related art, and/or later developed technologies for determining a planned path for the unmanned vehicle 102.

At step 302, the controller 210 determines a current position of the unmanned vehicle 102 in accordance with a current path followed by the unmanned vehicle 102. As discussed, the current position may be determined based on parameters such as, but not restricted to, vehicle trajectory parameters, signal parameters, environmental factors, and so forth.

At step 304, the controller 210 determines a planned position of the unmanned vehicle 102 in accordance with a planned path. In some embodiments, the planned path can be received from the base station 108 and/or from other companion unmanned vehicles 102. In some other embodiments, the planned path can be determined by the unmanned vehicle 102 itself. Further, the controller 210 determines parameters of the planned position. As discussed, the parameters of the planned position may be, but not restricted to, the vehicle trajectory parameters, the signal parameters, environmental factors and so forth.

Further, at step 306, the controller 210 compares the current position parameters of the unmanned vehicle 102 with the planned position parameters of the unmanned vehicle 102. Specifically, the controller 210 determines a difference between the current position parameters and the planned position parameters to determine a deviation of the unmanned vehicle 102 from the planned path. In some embodiments, the controller 210 determines a slight or minor deviation and/or extensive or major deviation on the basis of a comparison between the difference and the threshold value '$T_h$'. In some other embodiments, the controller 210 also determines signal deviation by determining a difference between the signal parameters of the planned position and the signal parameters of the current position. Subsequently, the controller 210 compares the difference with the threshold value '$T_h$'. Further, the controller generates and/or determines a new planned path for the unmanned vehicle 102 if the difference is greater than or equal to the threshold value '$T_h$'.

Next, at step 308, the controller 210 controls movements of the unmanned vehicle 102 to move along the new planned path.

Figure 4:
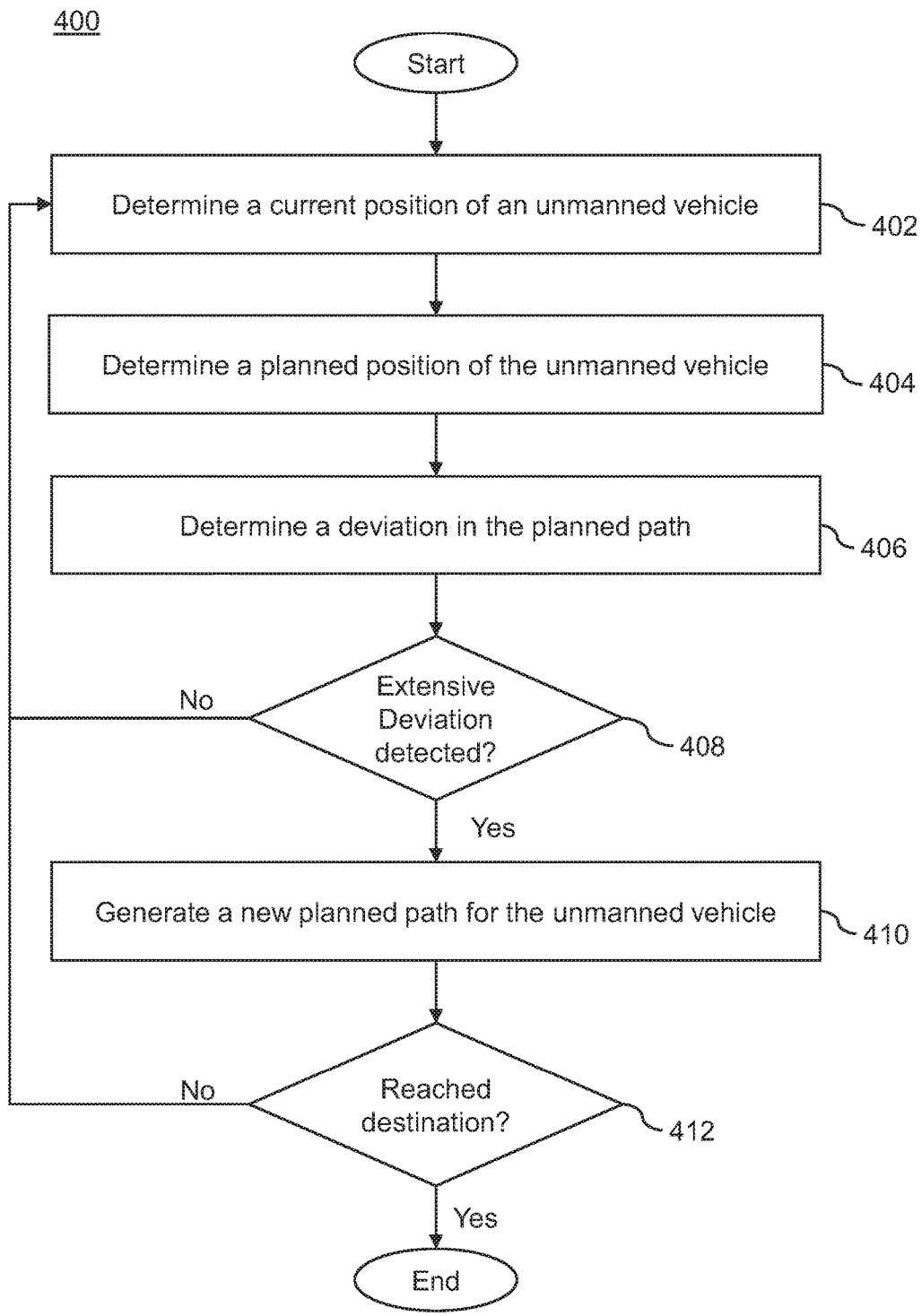
FIG. 4 is a method for detecting a deviation in a planned path by using an unmanned vehicle in accordance with the disclosed subject matter.

FIG. 4 is a flowchart of a procedure 400 for determining the new planned path based on the deviation limits by using an unmanned vehicle or optionally manned vehicle in accordance with the disclosed subject matter. The flow chart is merely provided for exemplary purposes, and the embodiments are intended to include or otherwise cover any methods or procedures, including known, related art, and/or later developed technologies for determining a planned path based on deviation limits by an unmanned vehicle.

In accordance with the flow chart of FIG. 4, at step 402, the controller 210 determines a current position of the unmanned vehicle 102 in accordance with the current path followed by the unmanned vehicle 102. Parameters to determine the current position of the unmanned vehicle 102 may include, but not restricted to, the vehicle trajectory parameters, the signal parameters, environmental factors and so forth.

At step 404, the controller 210 determines a planned position of the unmanned vehicle 102 in accordance with the planned path. Further, the controller 210 determines parameters of the planned position. As discussed, the parameters of the planned position may be, but not restricted to, the vehicle trajectory parameters, the signal parameters, environmental factors and so forth.

At step 406, the controller 210 compares the current position parameters of the unmanned vehicle 102 with the planned position parameters of the unmanned vehicle 102 to determine the deviation from the planned path. In some embodiments the controller 210 determines the slight or minor deviation, and extensive or major deviation on the basis of the comparison between the deviation and the predetermined threshold value '$T_h$'. In some other embodiments, the controller 210 also determines the signal deviation by comparing the signal parameters of the planned position with the signal parameters of the current position of the unmanned vehicle 102.

Next at step 408, the controller 210 determines whether an extensive deviation is detected. The controller 210 compares the deviation with a threshold value '$T_h$' in order to detect whether a minor or extensive deviation is detected. In case, the determined deviation is less than the threshold value '$T_h$', then the deviation is a minor deviation. In case, it is determined that the unmanned vehicle 102 is slightly deviated from the planned path and planning a new path can be inefficient, then the controller 210 controls the movement of the unmanned vehicle 102 to follow the current path, and the procedure 400 proceeds to step 402.

In case, the determined deviation is greater than or equal to the threshold value '$T_h$', then the deviation is an extensive deviation and the procedure 400 proceeds towards step 410. In case an extensive or major deviation is detected by the controller 210, the procedure 400 proceeds to step 410.

Next, at step 410, the controller 210 generates a new planned path based on the parameters, such as, but not restricted to, the vehicle trajectory parameters, the environmental factors and the signal parameters, and the like. The generated planned path is more efficient than the planned path. The controller 210 of the unmanned vehicle 102 then controls the movement of the unmanned vehicle 102 and follows the new generated path.

Further, at step 412, the controller 210 determines whether the unmanned vehicle 102 has reached the destination. In case, the unmanned vehicle 102 has reached its destination, then the procedure 400 concludes. In case, the unmanned vehicle 102 is still in the course of its journey and not yet reached the destination, then the procedure 400 moves to step 402 and the whole procedure 400 starts again.

IV. Exemplary Embodiments

An exemplary operation of the system 100 will be now described with reference to FIGS. 5A, 5B and 5C. In an exemplary scenario 500, three unmanned vehicles 102a-c start their journey from a source 516 to a destination 518. After starting the journey, the unmanned vehicles 102a-c may communicate with each other and autonomously form the system 100.

Figure 5A:
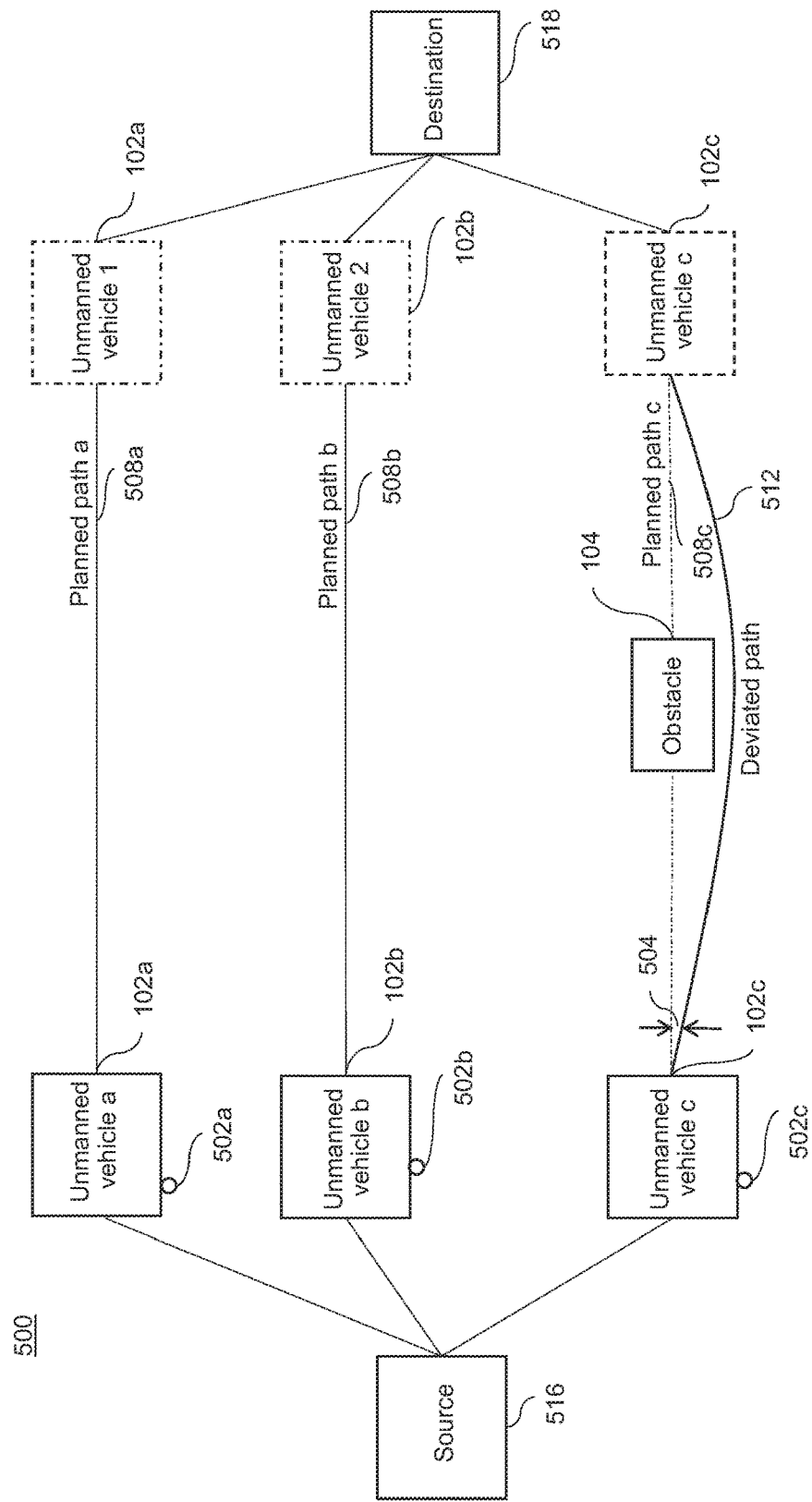
FIG. 5A is an exemplary environment for detecting a minor deviation in a planned path by an unmanned vehicle in accordance with the disclosed subject matter.
Figure 5B:
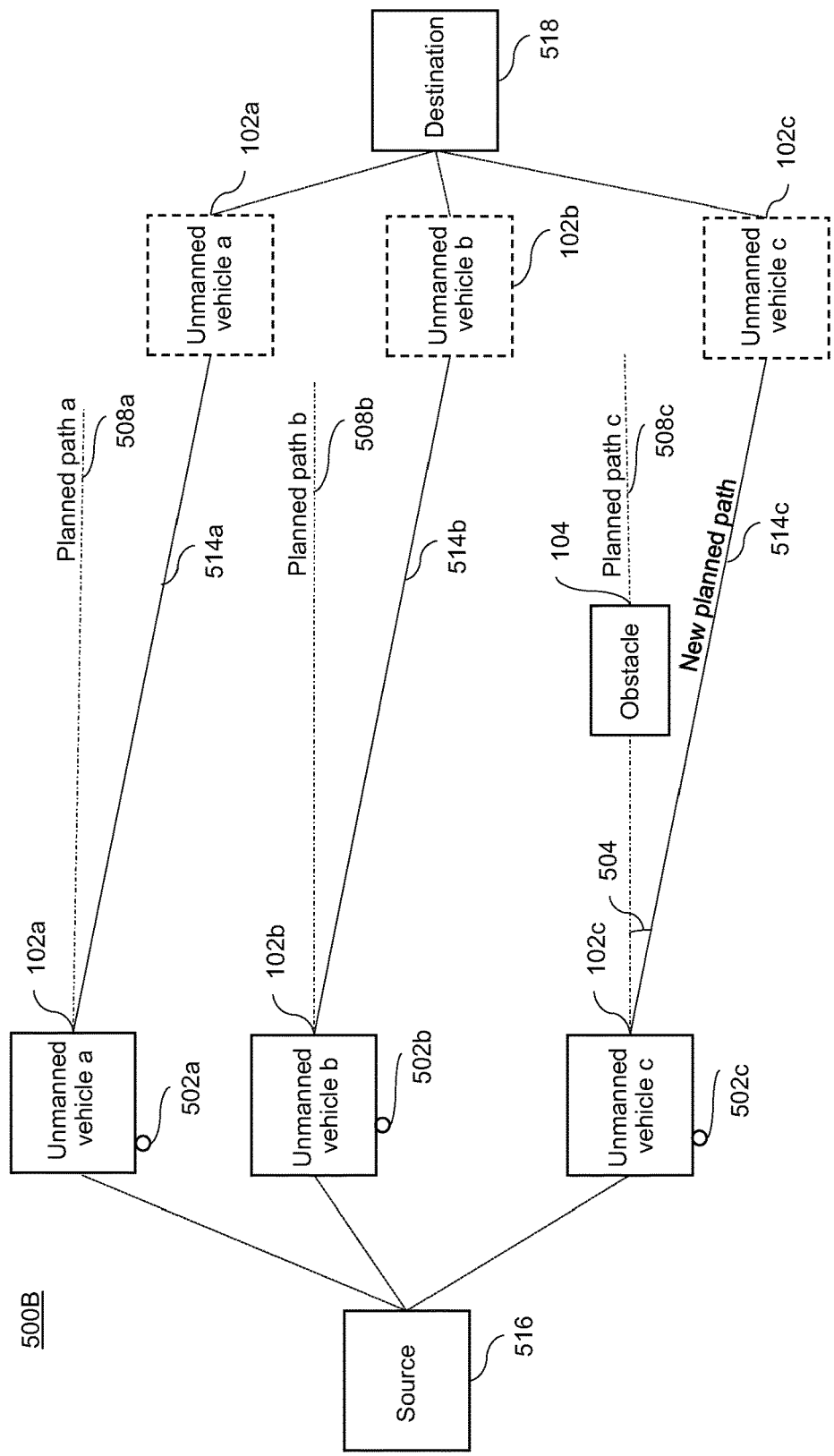
FIG. 5B is an exemplary environment for detecting a major deviation and path correction by an unmanned vehicle is accordance with the disclosed subject matter.

FIG. 5A illustrates an exemplary scenario in which the unmanned vehicle 102a-c are following pre-planned paths 508a-c. In FIG. 5A, a controller (not shown) of each of the unmanned vehicles 102a-c determines a current position 502a-c of each of the unmanned vehicles 102a-c respectively. The current positions 502a-c of the unmanned vehicle 102a-c can be determined by calculating various vehicle trajectory parameters, environmental factors and/or signal parameters of the unmanned vehicles 102a-c. For example, the controllers determine a current altitude '$A_c$' and current heading '$H_c$' of the unmanned vehicles 102a-c.

The controllers of the unmanned vehicles 102a-c also determine a planned position for each of the unmanned vehicles 102a-c respectively. Further, the controllers of the unmanned vehicles 102a-c determines vehicle trajectory parameters, environmental factor, signal parameters of the planned path of the unmanned vehicles 102a-c in order to determine the planned position for each of the unmanned vehicles 102a-c. For example, the controllers of the unmanned vehicles 102a-c determine the planned altitude '$A_p$' and planned heading '$H_p$' of the unmanned vehicles 102a-c.

In the exemplary scenario 500, the unmanned vehicle 102c veer off its planned path due an obstacle 104 in its planned path 508c. The controller of the unmanned vehicle 102c compares the parameters of the current position 502c and the parameters of the planned position of the unmanned vehicle 102c. In addition, the controller calculates the difference between the current position 502c and the planned position of the unmanned vehicle 102c, such that the difference value can be termed as a deviation value 504. For example, a current altitude '$A_c$' is 1000 meters of the unmanned vehicle 102c, while the planned altitude '$A_p$' of the unmanned vehicle 102c is 900 meters. The controller compares the current altitude '$A_c$' and the planned altitude '$A_p$' and determines a deviation of 100 meters in the altitude 'A' of the unmanned vehicle 102c.

The controller further determines a threshold value '$T_h$' for the deviation 504 of the unmanned vehicle 102c from the planned path by analyzing the environmental factors. As discussed, a sensor unit (not shown) of the unmanned vehicle 102c detects the current environmental conditions and based on the detected conditions, the controller determines the threshold value '$T_h$'. Further, the controller of the unmanned vehicle 102c communicates the determined threshold value '$T_h$' to the companion unmanned vehicles 102a-b. Thereafter, the controller of the unmanned vehicle 102c compares the deviation 504 and the determined threshold value '$T_h$'. Based on the comparison between the deviation 504 and the determines threshold value '$T_h$', it is determined that there is a minor deviation from the planned path 508c, and therefore, the unmanned vehicle 102c continues to move along the deviated path 512.

In some other exemplary scenario, the unmanned vehicle 102c can unexpectedly deviate from its planned path 508c. In an embodiment, the unexpected deviation can be determined by the other unmanned vehicles 102a-b in the fleet. In alternative embodiments, the control unit 204 and/or the base station 108 can determine the unexpected deviation. If the deviation value 504 is greater than or equal to the conformance threshold value '$T_{hc}$', the unmanned vehicle 102c can be flagged as a non-conforming unmanned vehicle and the other unmanned vehicles 102a-b in the fleet may ignore the calculations, if any, made by the unmanned vehicle 102c. In various embodiments, the base station 108, the control unit 204 of the unmanned vehicle 102c and/or the other unmanned vehicles 102a-b may flag the unmanned vehicle 102c as the non-conforming unmanned vehicle. Also, if the unmanned vehicle 102c is declared as the non-conforming unmanned vehicle, the base station 108 can assume control and may re-route the unmanned vehicle 102c along a safe path in order to avoid any collisions. Moreover, the control unit 204 may run diagnostics in order to determine any hardware and/or software faults that can cause the non-conforming behavior of the unmanned vehicle 102c. The results of the diagnostics may be shared with the base station 108.

In some embodiments, the base station 108, the control unit 204 of the unmanned vehicle 102c and/or the other unmanned vehicles 102a-b may monitor a deviation pattern of the unmanned vehicle 102c and can determine that the unmanned vehicle 102c is a non-conforming vehicle in case of repeated and unexpected deviations from the planned path in a given time period. FIG. 5B illustrates an exemplary scenario 500B in which unmanned vehicles 102a-c are following their respective planned paths 508a-c in accordance with the disclosed subject matter. As discussed, the controller of the each of the unmanned vehicles 102a-c determines their respective current position 502a-c, and planned positions. The controller of the unmanned vehicle 102c determines the threshold value '$T_h$' for the unmanned vehicle 102c.

In the exemplary scenario 500B, the unmanned vehicle 102c veer off its planned path due to the obstacle 104 in its planned path 508c. The controller of the unmanned vehicle 102c compares parameters of the current position 502a-c, with the parameters of the planned position in order to determine a deviation of the unmanned vehicle 102c from its planned path 508c. For example, the control controller of the unmanned vehicle 102c calculates a difference between the current altitude '$A_c$' and the planned Altitude '$A_p$' of the unmanned vehicle 102c and then calculates the deviation value 504 for the unmanned vehicle 102c. Further, the controller compares the calculated deviation value 504 with the determined threshold value '$T_h$'. The controller further determines that the deviation value 504 is greater than the threshold value '$T_h$', and therefore there is an extensive deviation from the planned path 508c. The controller of the unmanned vehicle 102c then generates a new planned path 514c for the unmanned vehicle 102c.

Further, the controller of the unmanned vehicle 102c controls movement of the unmanned vehicle 102c and follows the new planned path 514 to reach the destination 518. The controller also changes the trajectory parameters such as, an altitude 'A', a heading 'H', a speed 'S', a yaw, roll, pitch, and the like, of the unmanned vehicle 102c such that the unmanned vehicle 102c follows the new planned path 514. Also, the controller of the unmanned vehicle 102c communicates the new planned path 514 to the companion unmanned vehicles 102a-b.

Further, the other unmanned vehicles 102a-b in the fleet can verify that the deviation value 504 is less than the conforming threshold value '$T_{hc}$'. If the deviation value 504 is less than the conforming threshold value '$T_{hc}$', then the other unmanned vehicles 102a-b negotiate their paths accordingly and generate new planned paths 514a and 514b similar to the new planned path 514c, as shown in the FIG. 5B. In other embodiments, the base station 108 can compare the deviation value 504 with the conforming threshold value '$T_{hc}$' and verify that the unmanned vehicle 102c is behaving reliably. Based on the verification by the base station 108, the other unmanned vehicles 102a-b negotiate their paths accordingly and generate the new planned paths 514a and 514b similar to the new planned path 514c, as shown in the FIG. 5B.

FIG. 5C illustrates an exemplary scenario 500C illustrating unmanned vehicles 102a-c following planned paths 508a-c, in accordance with the disclosed subject matter. A sensor unit (not shown) of the unmanned vehicle 102c determines a storm 522 in the planned path 508c. The sensor unit then sends a signal to a control unit (not shown) of the unmanned vehicle 102c, to provide a warning about the storm 522 in the planned path 508c. The storm 522 can cause deviations from the planned path 508c, and therefore, to avoid the unnecessary deviation, the controller of the unmanned vehicle 102c generates a new planned path 520. The controller further controls the movement of the unmanned vehicle 102c to follow the new generated planned path 520.

V. Exemplary Computer System

Figure 6:
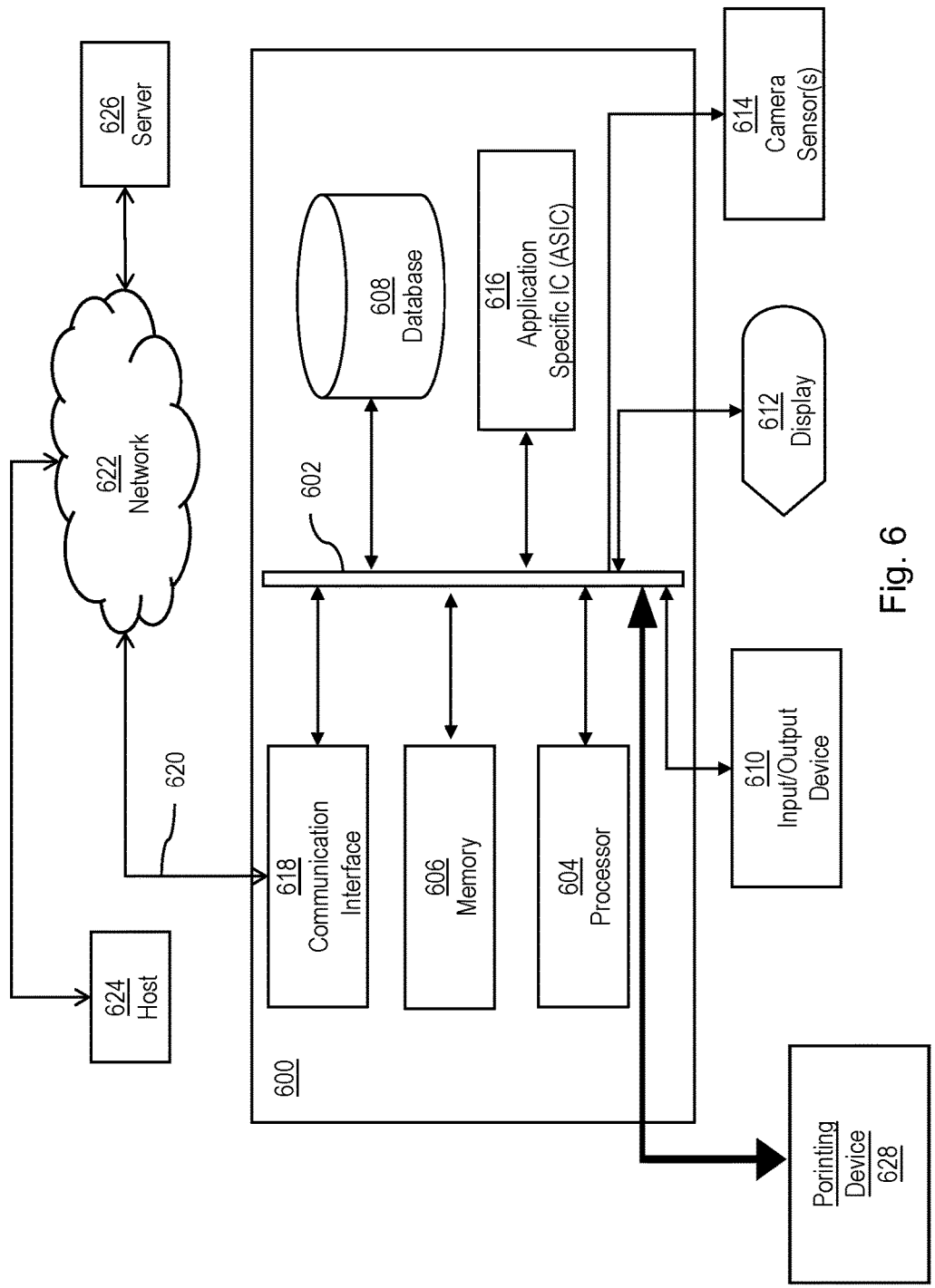
FIG. 6 is a computer system that can be used to implement various exemplary embodiments of the disclosed subject matter.

FIG. 6 illustrates a computer system 600 upon which an embodiment of the invention may be implemented. Various components of the unmanned vehicle 102 including the controller 210 and the control unit 204 may be implemented by the computer system 600. Although, the computer system 600 is depicted with respect to a particular device or equipment, it is contemplated that other devices or equipment (e.g., network elements, servers, etc.) within FIG. 6 can deploy the illustrated hardware and components of the computer system 600. The computer system 600 is programmed (e.g., via computer program code or instructions) to detect deviation from the planned path by using one or more unmanned vehicles 102 described herein and includes a communication mechanism such as a bus 602 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 600, or a portion thereof, constitutes a means for performing one or more steps for detecting deviation from the planned path by using one or more unmanned vehicles 102.

A bus 602 includes one or more parallel conductors of information so that information is transferred quickly among devices coupled to the bus 602. One or more processors 604 for processing information are coupled with the bus 602.

The processor (or multiple processors) 604 performs a set of operations on information as specified by computer program code related to detect the deviation from the planned path by using one or more unmanned vehicles 102. The computer program code is a set of instructions or statements providing instructions for the operation of the processor 604 and/or the computer system 600 to perform specified functions. The code, for example, may be written in a computer programming language that is compiled into a native instruction set of the processor 604. The code may also be written directly using the native instruction set (e.g., machine language). The set of operations include bringing information in from the bus 602 and placing information on the bus 602. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 604, such as a sequence of operation codes, constitute processor instructions, also called computer system instructions or, simply, computer instructions. The processors 604 may be implemented as mechanical, electrical, magnetic, optical, chemical, or quantum components, among others, alone or in combination.

The computer system 600 also includes a memory 606 coupled to the bus 602. The memory 606, such as a Random Access Memory (RAM) or any other dynamic storage device, stores information including processor instructions for storing information and instructions to be executed by the processor 604. The dynamic memory 606 allows information stored therein to be changed by the computer system 600. RAM allows a unit of information stored at a location called a memory address to be stored and retrieved independently of information at neighboring addresses. The memory 606 is also used by the processor 604 to store temporary values during execution of processor instructions. The computer system 600 also includes a Read Only Memory (ROM) or any other static storage device coupled to the bus 602 for storing static information, including instructions, that is not changed by the computer system 600. Some memory is composed of volatile storage that loses the information stored thereon when power is lost. Also coupled to the bus 602 is a non-volatile (persistent) storage device 608, such as a magnetic disk, a solid state disk, optical disk or flash card, for storing information, including instructions, that persists even when the computer system 600 is turned off or otherwise loses power.

Information, including instructions for detecting deviation from the planned by using one or more unmanned vehicles 102 is provided to the bus 602 for use by the processor 604 from an external input device 610, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 600. Other external devices coupled to the bus 602, used primarily for interacting with humans, include a display 612, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and pointing device 628, such as a mouse, a trackball, cursor direction keys, or a motion sensor, for controlling a position of a small cursor image presented on the display 612 and issuing commands associated with graphical elements presented on the display 612, and one or more camera sensors 614 for capturing, recording and causing to store one or more still and/or moving images (e.g., videos, movies, etc.) which also may comprise audio recordings. Further, the display 612 may be a touch enabled display such as capacitive or resistive screen. In some embodiments, for example, in embodiments in which the computer system 600 performs all functions automatically without human input, one or more of the external input device 610, and the display device 612 may be omitted.

In the illustrated embodiment, special purpose hardware, such as an ASIC 616, is coupled to the bus 602. The special purpose hardware is configured to perform operations not performed by the processor 604 quickly enough for special purposes. Examples of ASICs include graphics accelerator cards for generating images for the display 612, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 also includes one or more instances of a communication interface 618 coupled to the bus 602. The communication interface 618 provides a one-way or two-way communication coupling to a variety of external devices that operate with their own processors, such as printers, scanners and external disks. In general, the coupling is with a network link 620 that is connected to a local network 622 to which a variety of external devices with their own processors are connected. For example, the communication interface 618 may be a parallel port or a serial port or a Universal Serial Bus (USB) port on a personal computer. In some embodiments, the communication interface 618 is an Integrated Services Digital Network (ISDN) card, a Digital Subscriber Line (DSL) card, or a telephone modem that provides an information communication connection to a corresponding type of a telephone line. In some embodiments, the communication interface 618 is a cable modem that converts signals on the bus 602 into signals for a communication connection over a coaxial cable or into optical signals for a communication connection over a fiber optic cable. As another example, the communications interface 618 may be a Local Area Network (LAN) card to provide a data communication connection to a compatible LAN, such as Ethernet or an Asynchronous Transfer Mode (ATM) network. In one embodiment, wireless links may also be implemented. For wireless links, the communication interface 618 sends or receives or both sends and receives electrical, acoustic or electromagnetic signals, including infrared and optical signals that carry information streams, such as digital data. For example, in wireless handheld devices, such as mobile telephones like cell phones, the communication interface 618 includes a radio band electromagnetic transmitter and receiver called a radio transceiver. In certain embodiments, the communication interface 618 enables connection to the communication network 106 for detecting deviation from the planned by using one or more unmanned vehicles 102. Further, the communication interface 618 can include peripheral interface devices, such as a thunderbolt interface, a Personal Computer Memory Card International Association (PCMCIA) interface, etc. Although a single communication interface 618 is depicted, multiple communication interfaces can also be employed.

The term "computer-readable medium" as used herein refers to any medium that participates in providing information to the processor 604, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 608. Volatile media include, for example, the dynamic memory 606. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 616.

The network link 620 typically provides information communication using transmission media through one or more networks to other devices that use or process the information. For example, the network link 620 may provide a connection through the local network 622 to a host computer 624 or to ISP equipment operated by an Internet Service Provider (ISP).

A computer called a server host 626, connected to the Internet, hosts a process that provides a service in response to information received over the Internet. For example, the server hosts 626 hosts a process that provides information representing video data for presentation at the display 612. It is contemplated that the components of the computer system 600 can be deployed in various configurations within other computer systems, e.g., the host 624 and the server 626.

At least some embodiments of the invention are related to the use of the computer system 600 for implementing some or all of the techniques described herein. According to one embodiment of the invention, those techniques are performed by the computer system 600 in response to the processor 604 executing one or more sequences of one or more processor instructions contained in the memory 606. Such instructions, also called computer instructions, software and program code, may be read into the memory 606 from another computer-readable medium such as the storage device 608 or the network link 620. Execution of the sequences of instructions contained in the memory 606 causes the processor 604 to perform one or more of the method steps described herein. In alternative embodiments, hardware, such as the ASIC 616, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 604 for execution. For example, instructions and data may initially be carried on a magnetic disk of a remote computer such as the host 624. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 620. An infrared detector serving as the communication interface 618 receives the instructions and data carried in the infrared signal and places information representing the instructions and data onto the bus 602. The bus 602 carries the information to the memory 606 from which the processor 604 retrieves and executes the instructions using some of the data sent with the instructions. The instructions and data received in the memory 606 may optionally be stored on the storage device 608, either before or after execution by the processor 604.

VI. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

For example, embodiments are disclosed above in the context of an unmanned vehicle. However, embodiments are intended to include or otherwise cover any type of unmanned vehicle, including, an unmanned aerial vehicle, an unmanned terrestrial vehicle (for example, a driverless car), an unmanned terrestrial railed vehicle, an unmanned aquatic or oceanic vehicle, a drone, a gyrocopter, etc. In fact, embodiments are intended to include or otherwise cover configurations, including known, related art, and/or later developed technologies of the unmanned vehicle and/or optionally manned vehicle.

Embodiments are disclosed above in context of detecting the deviation from the planned path of the unmanned vehicle moving from point 1 to point 2. However, embodiments are intended to cover any unmanned vehicle for inspection purposes, defense drones, surveillance purposes, recreational purposes, and so forth.

Exemplary embodiments are also intended to cover any method of detecting and flagging a non-conforming unmanned vehicle in a fleet based on a deviation of the non-conforming unmanned vehicle form its planned path. In fact, embodiments are intended to include or otherwise cover detection of any non-conforming behavior of an unmanned vehicle due to hardware and/or software faults.

Exemplary embodiments are intended to include or otherwise cover any type of obstacle and/or factor which can cause deviation in the planned path of the unmanned vehicle and/or optionally manned vehicle Exemplary embodiments are intended to include or otherwise cover infrared obstacle detection technique for the detection of obstacles in the planned path of the unmanned vehicle.

Exemplary embodiments are also intended to cover any additional or alternative components of the unmanned vehicle disclosed above. Exemplary embodiments are further intended to cover omission of any component of the unmanned vehicle disclosed above.

Embodiments are intended to include or otherwise cover use of unmanned terrestrial vehicles for passenger transport, transportation of goods, and so forth.

Embodiments are intended to include or otherwise cover the determination of a new planned path for unmanned terrestrial vehicle. The reason can be beneficial because vehicles travelling on the roads are more prone to deviation due to other vehicles moving on the road.

Embodiments are intended to include or otherwise cover any technique involving the use of deviation limits to determine whether an unmanned vehicle or an optionally manned vehicle needs to follow a current path or generate a new path. This may avoid repeated calculation of new paths especially in case of minor deviations, thereby decreasing computational efforts and increasing efficiency.

Embodiments are intended to include or otherwise cover use of unmanned oceanic vehicles for underwater surveillance, helping persons stranded in the ocean, and so forth.

Embodiments are intended to include or otherwise cover use of unmanned space vehicles for space expeditions, carrying satellites to space, and so forth.

Embodiments are intended to include or otherwise cover use of sensed environmental conditions by the unmanned for accurately estimating weather conditions.

Embodiments are intended to include or otherwise cover use of signal parameters by the unmanned vehicle for accurately detecting communication faults.

Exemplary embodiments are also intended to include or otherwise cover a V-formation of the two or more unmanned vehicles (hereinafter referred to as a swarm or a fleet of unmanned vehicles), which can cause each of the unmanned vehicles to be well separated. The separation of the unmanned vehicles can allow each of the unmanned vehicles to individually determine the parameters of the current location and further, in determining the deviation causes. However, embodiments of the disclosed subject matter are intended to include or otherwise cover any type of formation that may be beneficial.

Embodiments are also intended to include or otherwise cover methods of manufacturing the unmanned vehicle and/or the optionally manned vehicle disclosed above. The methods of manufacturing include or otherwise cover processors and computer programs implemented by processors used to design various elements of the unmanned vehicle disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of the unmanned vehicles disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A method of controlling an unmanned vehicle operatively coupled to a controller that includes a sensing unit, the method comprising:
    determining, by the controller, a current position of the unmanned vehicle;
    determining, by the controller, a planned position based on a planned path of the unmanned vehicle;
    determining, by the controller, an actual deviation of the unmanned vehicle based on the planned position and the current position of the unmanned vehicle;
    controlling, by the controller, a movement of the unmanned vehicle such that the unmanned vehicle continues to move along one of the planned path and a current path without corrective action if the actual deviation of the unmanned vehicle is less than at least two thresholds, wherein the at least two thresholds are determined, based on
        a first deviation parameter, which includes vehicle trajectory parameters, wherein the vehicle trajectory parameters include at least one of altitude, heading, speed, yaw, roll and pitch, and
        a second deviation parameter, which includes at least one environmental factors;
    providing for utilizing, by the controller, a time parameter being associated with at least the first deviation parameter for assessment of deviation time by the controller;
    detecting, by the controller, the environmental factors impacting the unmanned vehicle;
    modifying a value of the second deviation parameter based on the environmental factors, which include ambient weather condition;
    communicating by the controller with at least one of a base station and a companion unmanned vehicle, wherein the communicating includes receiving, by a receiver of the unmanned vehicle, a signal from at least one of the companion unmanned vehicle and the base station;
    determining, by the controller, a signal deviation based on a predetermined parameter of the signal and a corresponding predetermined signal threshold; and
    controlling, by the controller, the movement of the unmanned vehicle such that the unmanned vehicle moves along the planned path if the signal deviation is less than the predetermined signal threshold.

2. The method of claim 1, wherein the actual deviation is equal to a difference between the planned position and the current position of the unmanned vehicle.

3. The method of claim 1, further comprising:
    determining, by the controller, a new planned path for the unmanned vehicle if the actual deviation is greater than or equal to at least one of the at least two thresholds; and
    controlling, by the controller, the movement of the unmanned vehicle such that the unmanned vehicle moves along the new planned path.

4. The method of claim 1, further comprising communicating, by the controller, the new planned path to a companion unmanned vehicle.

5. The method of claim 1, wherein the ambient weather condition is at least one of temperature, pressure, wind speed, visibility and turbulence.

6. The method of claim 1, further comprising:
    determining, by the controller, a new planned path for the unmanned vehicle if the signal deviation is greater than or equal to the predetermined signal threshold; and
    controlling, by the controller, the movement of the unmanned vehicle such that the unmanned vehicle moves along the new planned path.

7. The method of claim 1, wherein the parameter of the signal is at least one of a signal strength, a signal sensitivity, a data transfer rate, and a phase of the signal.

8. The method of claim 1, wherein the signal parameters include at least one of signal strength, transmitter/receiver data rate, transmitter/receiver sensitivity, transmitter/receiver power, and a phase of a signal.

9. An unmanned vehicle, which includes a controller, comprising:
    a memory unit that is configured to store a planned path of the unmanned vehicle, the memory unit including at least one of a memory device, a Random Access Memory (RAM), and dynamic storage device;
    a position unit that is configured to determine a current position of the unmanned vehicle, the position unit further configured to determine a planned position of the unmanned vehicle based on the planned path stored in the memory unit, the position unit including:
        at least one of ranging tones, relative vehicle telemetry, optical imaging, radar, and global positioning system (GPS), corresponds to positioning software;
    a control unit disposed in communication with the position unit, the control unit, which includes at least one of software and hardware, configured to:
        determine an actual deviation of the unmanned vehicle, based on the planned position and the current position of the unmanned vehicle; and
        control a movement of the unmanned vehicle such that the unmanned vehicle continues to move along the planned path without corrective action if the actual deviation of the unmanned vehicle is less than at least two thresholds, wherein:
            the at least two thresholds are determined and based on:
                a first deviation parameter, which includes vehicle trajectory parameters, wherein the vehicle trajectory parameters include at least one of altitude, heading, speed, yaw, roll and pitch, and
                a second deviation parameter, which includes at least one environmental factors; and
            the controller is configured to utilize a time parameter associated with at least the first deviation parameter for assessment of deviation time;
    a communication unit that corresponds with the at least one of the software and the hardware of the control unit and communicates with a receiver, the communication unit including at least one of radio communications based on frequency spectrum and supporting infrastructure; and
    a sensor unit that transmits a signal to the control unit to convey at least one change in environmental factors, the sensor unit including at least one of a humidity sensor, a temperature sensor, a pressure sensor and other related sensors, wherein:
        the sensor unit is configured to detect the environmental factors which impact the unmanned vehicle,
        the control unit is configured to modify a value of at least one of said at least two predetermined thresholds based on the environmental factors, where the environmental factors include ambient weather conditions,
        the communication unit provides communication with at least one of a base station and a companion unmanned vehicle, wherein the communication unit includes the receiver configured to receive a signal from at least one of the companion unmanned vehicle and the base station, and the control unit is further configured to determine a signal deviation based on a predetermined parameter of the signal and a corresponding predetermined signal threshold, and control the movement of the unmanned vehicle such that the unmanned vehicle moves along the planned path if the signal deviation is less than the predetermined signal threshold.

10. The unmanned vehicle of claim 9, wherein the actual deviation is equal to a difference between the planned position and the current position of the unmanned vehicle.

11. The unmanned vehicle of claim 9, wherein the control unit is further configured to:
   determine a new planned path for the unmanned vehicle if the actual deviation is greater than or equal to at least one of the at least two thresholds; and
   control the movement of the unmanned vehicle such that the unmanned vehicle moves along the new planned path.

12. The unmanned vehicle of claim 11, wherein the communication unit is configured to communicate the new planned path to a companion unmanned vehicle.

13. The unmanned vehicle of claim 9, wherein the ambient weather condition is at least one of temperature, pressure, wind speed, visibility and turbulence.

14. The unmanned vehicle of claim 9, wherein the parameter of the signal is at least one of a signal strength, a signal sensitivity, a data transfer rate, and a phase of the signal.

15. The unmanned vehicle of claim 9, wherein the unmanned vehicle is one of an unmanned aerial vehicle, an unmanned terrestrial vehicle, an unmanned aquatic vehicle, an unmanned space vehicle and an optionally manned vehicle.

16. A system, comprising:
   a plurality of unmanned vehicles spaced from each other, each of the plurality of unmanned vehicles including:
   a controller;
   a memory unit that is configured to store a planned path of the unmanned vehicle, the memory unit including at least one of a memory device, a Random Access Memory (RAM), and any dynamic storage device;
   a position unit that is configured to determine a current position of the unmanned vehicle, the position unit further configured to determine a planned position of the unmanned vehicle based on the planned path data stored in the memory unit, wherein the position unit, which including at least one of ranging tones, relative vehicle telemetry, optical imaging, radar, and global positioning system (UPS), corresponds to positioning software; and a control unit, in communication with the memory unit and the position unit, configured to:
   determine an actual deviation of at least one of the unmanned vehicles based on the planned position and the current position of the unmanned vehicle;
   if the deviation is at least one of greater than and equal to at least one of at least two thresholds, the control unit is configured to:
      determine a new planned path for the unmanned vehicle;
      communicate, by the controller, the new planned path to other companion unmanned vehicles; and
      control a movement of the unmanned vehicle such that the unmanned vehicle moves along the new planned path; and
   if the actual deviation of the unmanned vehicle is less than said at least two thresholds, the control unit is also configured to:
      control the movement of the unmanned vehicle such that the unmanned vehicle continues to move along the planned path without corrective action, and
   wherein the at least two thresholds are determined and based on:
      a first deviation parameter, which includes vehicle trajectory parameters, wherein the vehicle trajectory parameters include at least one of altitude, heading, speed, yaw, roll and pitch, and
      a second deviation parameter, which includes at least one environmental factors,
   provide for the controller to utilize a time parameter associated with at least the first deviation parameter for assessment of deviation time;
   receive, by a receiver of the unmanned vehicle, a signal from said at least one other companion unmanned vehicle;
   determine, by the controller, a signal deviation based on a predetermined parameter of the signal and a corresponding predetermined signal threshold; and
   control, by the controller, the movement of the unmanned vehicle such that the unmanned vehicle moves along the planned path if the signal deviation is less than the predetermined signal threshold.

* * * * *